US010678339B2

(12) United States Patent
Yeom et al.

(10) Patent No.: US 10,678,339 B2
(45) Date of Patent: Jun. 9, 2020

(54) ELECTRONIC DEVICE AND METHOD FOR CONTROLLING THE SAME

(71) Applicant: LG ELECTRONICS INC., Seoul (KR)

(72) Inventors: Jungho Yeom, Seoul (KR); Darae Kim, Seoul (KR); Youngwoo Kim, Seoul (KR); Dami Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 285 days.

(21) Appl. No.: 15/621,911

(22) Filed: Jun. 13, 2017

(65) Prior Publication Data

US 2018/0024640 A1 Jan. 25, 2018

(30) Foreign Application Priority Data

Jul. 22, 2016 (KR) .................... 10-2016-0093159

(51) Int. Cl.
| | |
|---|---|
| *G06F 3/01* | (2006.01) |
| *G08G 1/0962* | (2006.01) |
| *G08G 1/0967* | (2006.01) |
| *G02B 27/18* | (2006.01) |
| *G06F 3/0484* | (2013.01) |
| *G06F 3/042* | (2006.01) |

(Continued)

(52) U.S. Cl.
CPC ............ *G06F 3/017* (2013.01); *G02B 27/18* (2013.01); *G06F 3/0425* (2013.01); *G06F 3/0484* (2013.01); *G08G 1/09626* (2013.01); *G08G 1/096725* (2013.01); *G08G 1/165* (2013.01); *G02B 27/20* (2013.01); *G06F 2203/04806* (2013.01)

(58) Field of Classification Search
CPC .......... G08B 13/187; G06T 7/254; B60Q 1/28
See application file for complete search history.

(56) References Cited

U.S. PATENT DOCUMENTS

| 10,275,662 B1 * | 4/2019 | Askeland ............... H04N 5/247 |
| 2008/0063239 A1 | 3/2008 | MacNeille et al. |
| 2010/0017111 A1 | 1/2010 | Stefani |

(Continued)

FOREIGN PATENT DOCUMENTS

| CN | 102923215 | 2/2013 |
| JP | H0471000 | 3/1992 |

(Continued)

OTHER PUBLICATIONS

PCT International Application No. PCT/KR2017/005532, Notification of Transmittal of the International Search Report and the Written Opinion of the International Searching Authority, or Declaration dated Sep. 12, 2017, 14 pages.

(Continued)

*Primary Examiner* — Anthony R Jimenez
(74) *Attorney, Agent, or Firm* — Lee, Hong, Degerman, Kang & Waimey

(57) ABSTRACT

The present invention relates to an electronic device and a method of operating the same. The electronic device can project an infrared (IR) grid to a road and capture the projected IR grid. The electronic device can determine a road status of the road based on the captured IR grid and project information on the road status based on the determined road status.

14 Claims, 21 Drawing Sheets

(51) Int. Cl.
*G08G 1/16* (2006.01)
*G02B 27/20* (2006.01)

(56) References Cited

U.S. PATENT DOCUMENTS

| | | |
|---|---|---|
| 2013/0113910 A1 | 5/2013 | Kim |
| 2014/0267415 A1 | 9/2014 | Tang et al. |
| 2014/0347469 A1* | 11/2014 | Zhang ..................... B60R 1/00 348/118 |
| 2015/0360697 A1 | 12/2015 | Baek et al. |
| 2016/0216521 A1* | 7/2016 | Yachida ............... G01C 21/365 |
| 2016/0253566 A1* | 9/2016 | Stein .................. G06K 9/00791 348/148 |

FOREIGN PATENT DOCUMENTS

| | | |
|---|---|---|
| JP | 2014144725 | 8/2014 |
| JP | 2016109530 | 6/2016 |
| WO | 2004074582 | 9/2004 |
| WO | 2015090330 | 6/2015 |

OTHER PUBLICATIONS

European Patent Office Application Serial No. 17831205.4, Search Report dated Feb. 14, 2020, 8 pages.

\* cited by examiner

FIG. 8
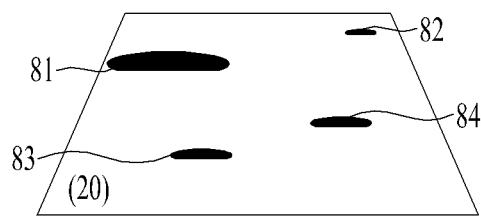
(a)
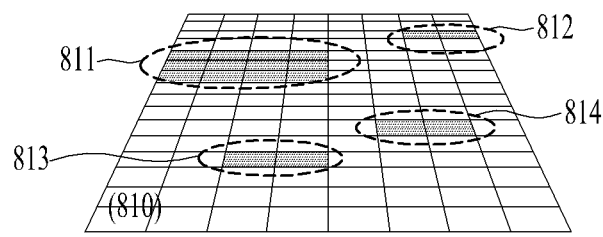
(b)
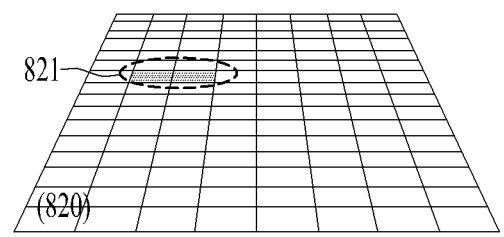
(c)

FIG. 12
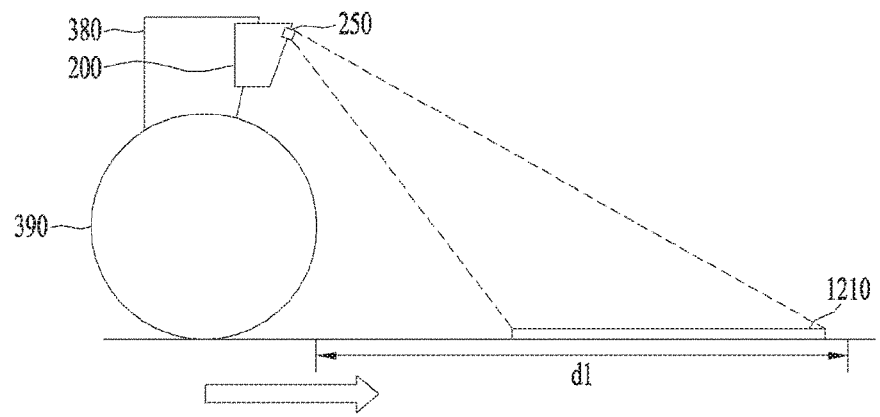
(a) first speed
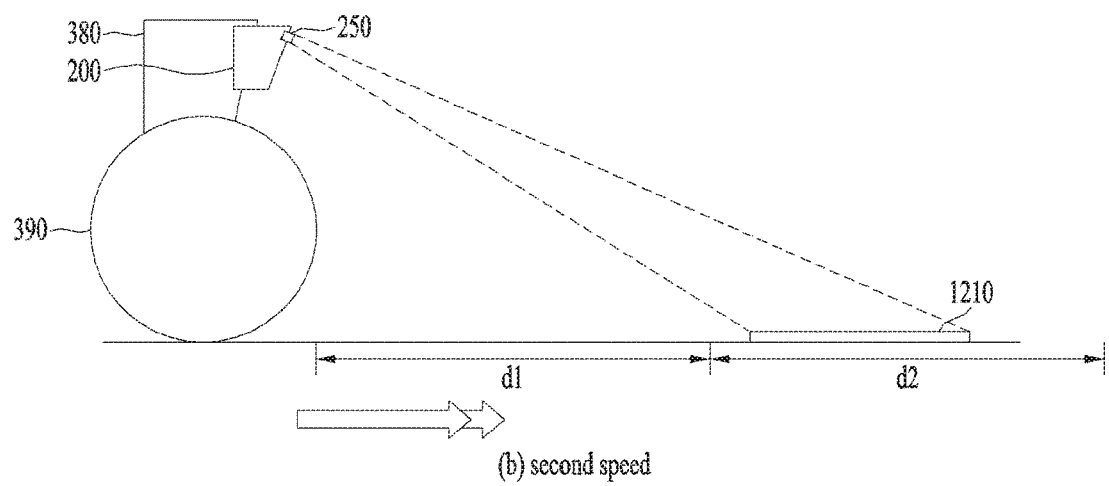
(b) second speed
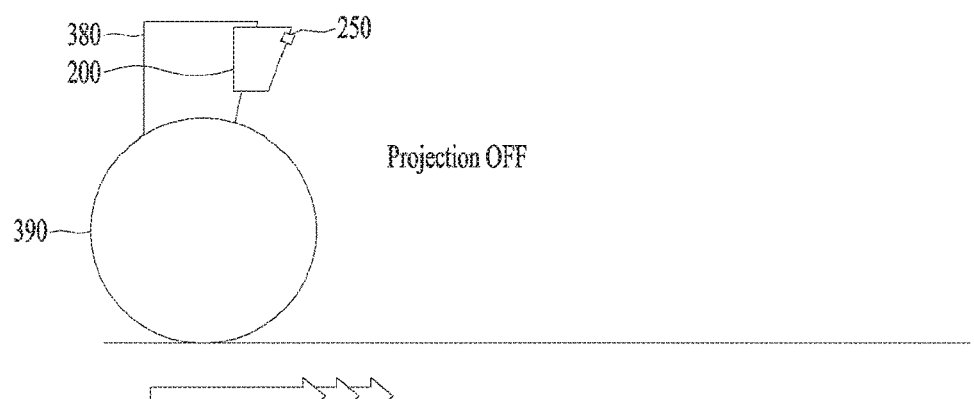
(c) third speed FIG. 19
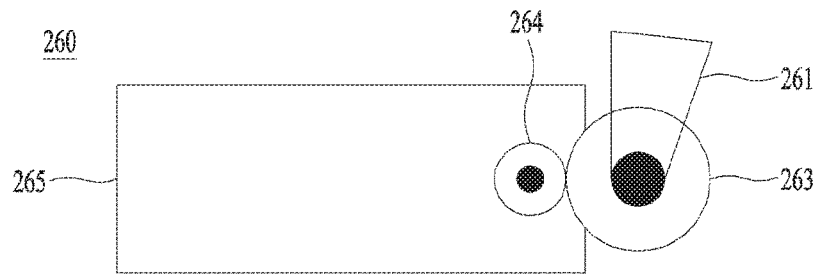
FIG. 20
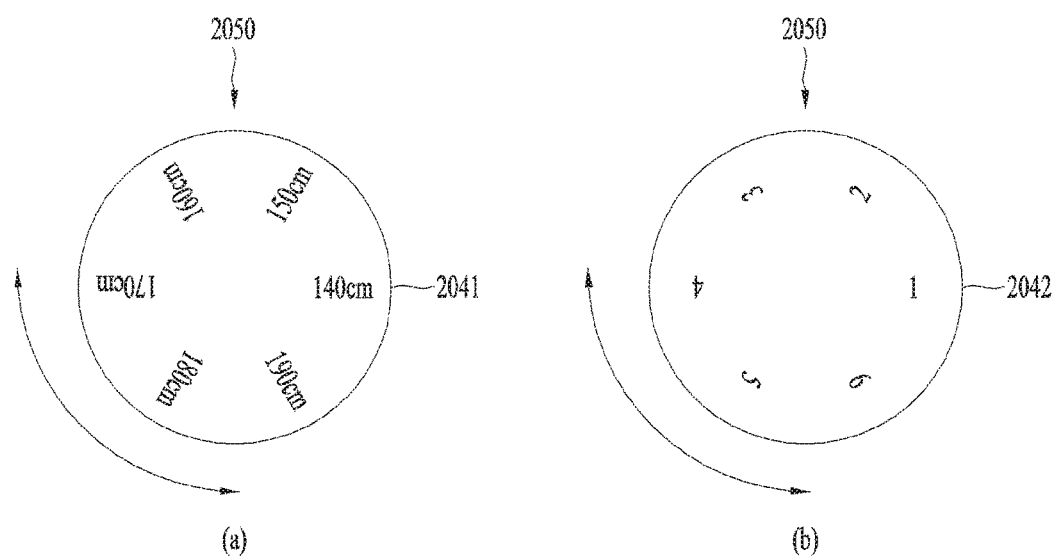
(a)  (b)
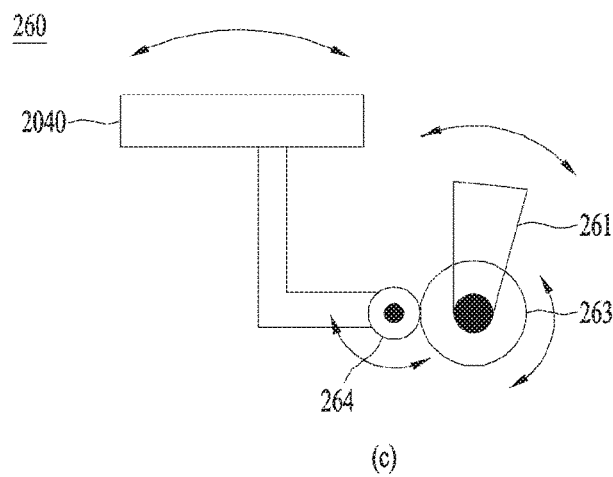
(c)

FIG. 22
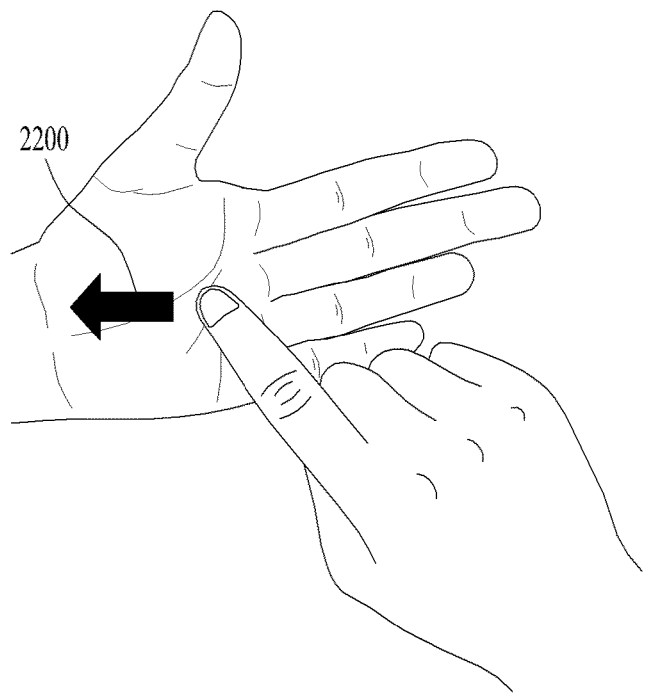
(a)
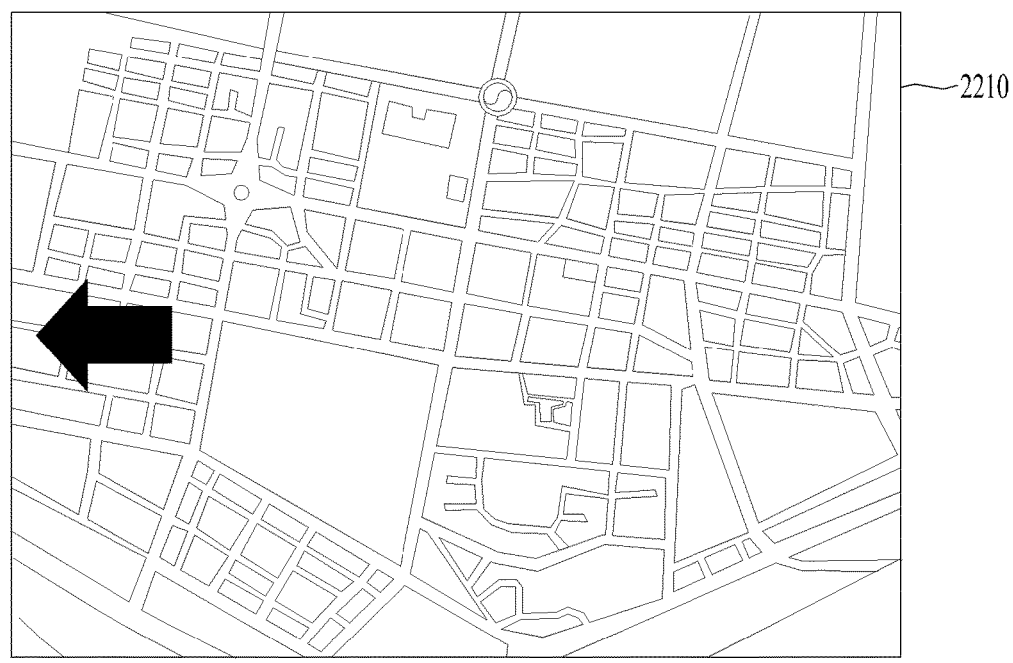
(b)

FIG. 23
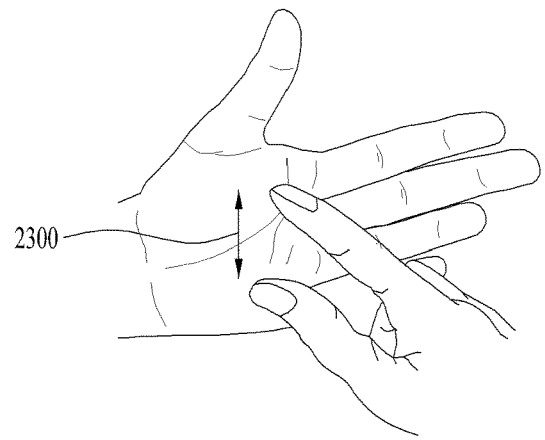
(a)
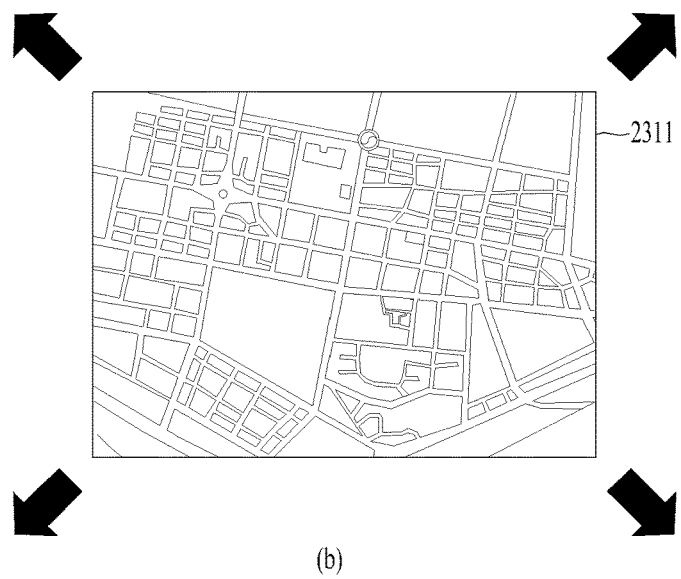
(b)
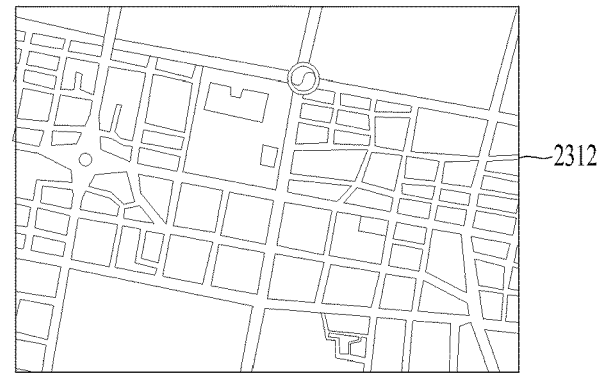
(c)

FIG. 24
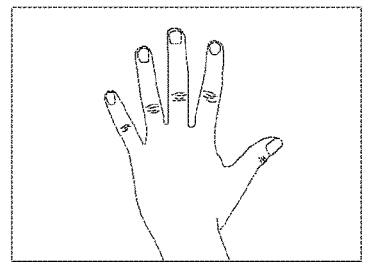 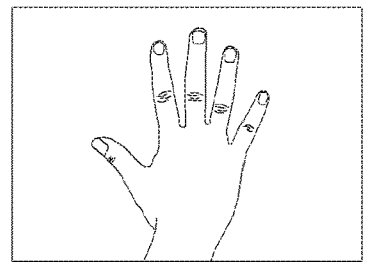
(a) execute or stop while driving
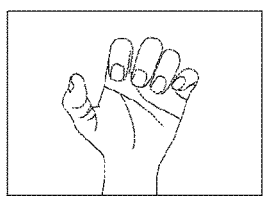 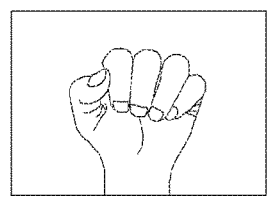 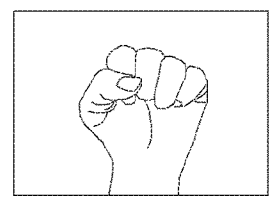 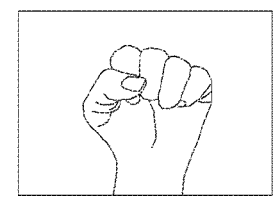
(b) accelerate while driving
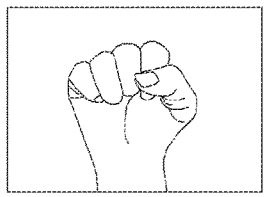 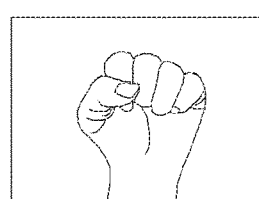 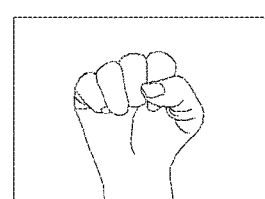 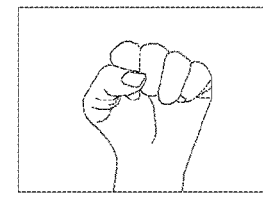
(c) rotate while driving
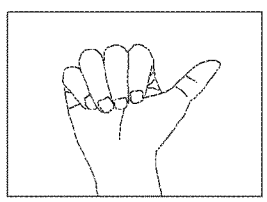 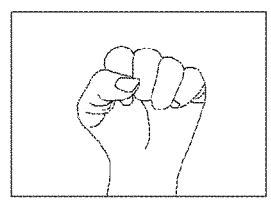 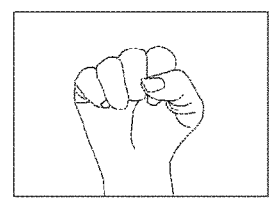 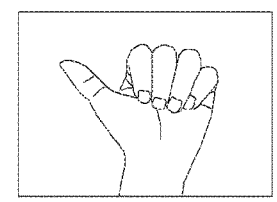
(d) turn on turn signal

ELECTRONIC DEVICE AND METHOD FOR CONTROLLING THE SAME

Pursuant to 35 U.S.C. § 119(a), this application claims the benefit of earlier filing date and right of priority to Korean Application No. 10-2016-0093159, filed on Jul. 22, 2016, the contents of which are all hereby incorporated by reference herein in its entirety.

BACKGROUND OF THE INVENTION

Field of the Invention

The present invention relates to an electronic device and a method of controlling therefor, and more particularly, to an electronic device projecting information related to a personal mobility device to a road and a method of controlling therefor.

Discussion of the Related Art

A personal mobility device corresponds to a means of transportation for a single person. The personal mobility device establishes itself not only as a means of leisure, commuting and moving a short distance but also as a new means of transportation while being recognized as an environment-friendly means of transportation.

Since the personal mobility device (hereinafter, personal mobility) is unaffected by traffic congestion, it makes a user quickly move in a downtown area. Since the personal mobility is easy to carry, it is not necessary to worry about a parking problem. Moreover, since the personal mobility is able to use such power as an electric battery, it is economical and eco-friendly.

The personal mobility is manufactured in various shapes and various principles are applied to the personal mobility. The personal mobility is mainly divided into a product of a single wheel and a product of two wheels. The personal mobility may have a shape evolved from such a legacy means of transportation as an electric kick board, an electric bicycle, and a micro car.

Sometimes, although the personal mobility is equipped with its own display and displays various informations, due to the characteristic of the personal mobility, it is difficult to install a display of big screen in the personal mobility and it is difficult to place a display at a position which is good for a passenger of the personal mobility to see. Hence, it is difficult to display information related to the driving of the personal mobility on the display.

And, the personal mobility is easy to carry and corresponds to a means of transportation for a single person or two persons. Since the personal mobility has characteristics of a small size and light in weight, it is impossible for the personal mobility to avoid an impact of a bump in the road or a barrier. Hence, the barrier or the bump in the road may become a great risk in driving the personal mobility.

SUMMARY OF THE INVENTION

Accordingly, the present invention is directed to an apparatus and method thereof that substantially obviate one or more problems due to limitations and disadvantages of the related art.

An object of the present invention is to display various information related to the driving of a personal mobility on a road by projecting the information on the road.

Another object of the present invention is to recognize a risk element on a road and provide information on the recognized risk element.

Another object of the present invention is to provide information in response to the driving of a personal mobility based on a driving condition of the personal mobility, performance and user information.

The other object of the present invention is provide an intuitive and convenient input means to a user while not degrading mobility of a personal mobility.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of operating an electronic device includes the steps of projecting an infrared (IR) grid to a road, capturing the projected IR grid, determining a road status of the road based on the captured IR grid and projecting information on the road status on the road based on the determined road status.

To further achieve these objects and other advantages and in accordance with the purpose of the invention, as embodied and broadly described herein, according to a different embodiment, an electronic device includes a projector configured to project an image, a light emitting module configured to project an infrared (IR) grid to a road, a camera configured to capture the projected IR grid, and a controller configured to determine a road status of the road based on the captured IR grid, the controller configured to control the projector to project information on the road status on the road based on the determined road status.

According to embodiments of the present invention, an electronic device is able to project and display various information related to the driving of a personal mobility on a road. Hence, it is able to easily check information required by a user of the personal mobility.

According to the present invention, it is able to able recognize a risk element on a road and provide information on the recognized risk element. Hence, a user of a personal mobility can drive safely.

According to the present invention, it is able to provide information related to the driving of a personal mobility at an appropriate distance and appropriate moment based on a driving condition of the personal mobility, performance, and user information.

According to the present invention, it is able to provide an intuitive and easy-to-use input means to a user while mobility of a personal mobility is not deteriorated.

An additional scope to which the present invention is applicable is going to be clearly understood based on the following detail description. Various changes and modifications can be clearly understood by those skilled in the art within the idea and the scope of the present invention. Hence, specific embodiment such as the detail description and preferred embodiment of the present invention should be understood as a given example.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a diagram for an example of recognizing a dangerous area based on sensitivity adjustment according to various embodiments of the present invention;

FIG. 12 is a diagram for an example of projecting an image to a distance corresponding to a moving speed according to various embodiments of the present invention;

FIG. 19 is a diagram for a configuration of a control sensor module according to various embodiments of the present invention;

FIG. 20 is a diagram for an example of a manual rotation of a radar sensor according to various embodiments of the present invention;

FIGS. 22 to 23 are diagrams for an example of displaying a screen based on a gesture according to various embodiments of the present invention;

FIG. 24 is a diagram for an example of gestures for driving functions according to various embodiments of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

An electronic device disclosed in the present specification may include a terminal such as a mobile phone, a smartphone, a laptop computer, a digital broadcast terminal, a PDA (personal digital assistants), PMP (portable multimedia player), a navigation, a slate PC, a tablet PC, a ultrabook, a wearable device (e.g., a smartwatch, a smart glass, a head mounted display) (HMD), etc.).

By way of non-limiting example only, further description will be made with reference to particular types of electronic devices. However, such teachings apply equally to other types of electronic devices, such as those types noted above. In addition, these teachings may also be applied to stationary electronic devices such as digital TV, desktop computers, digital signage and the like.

Figure 1:
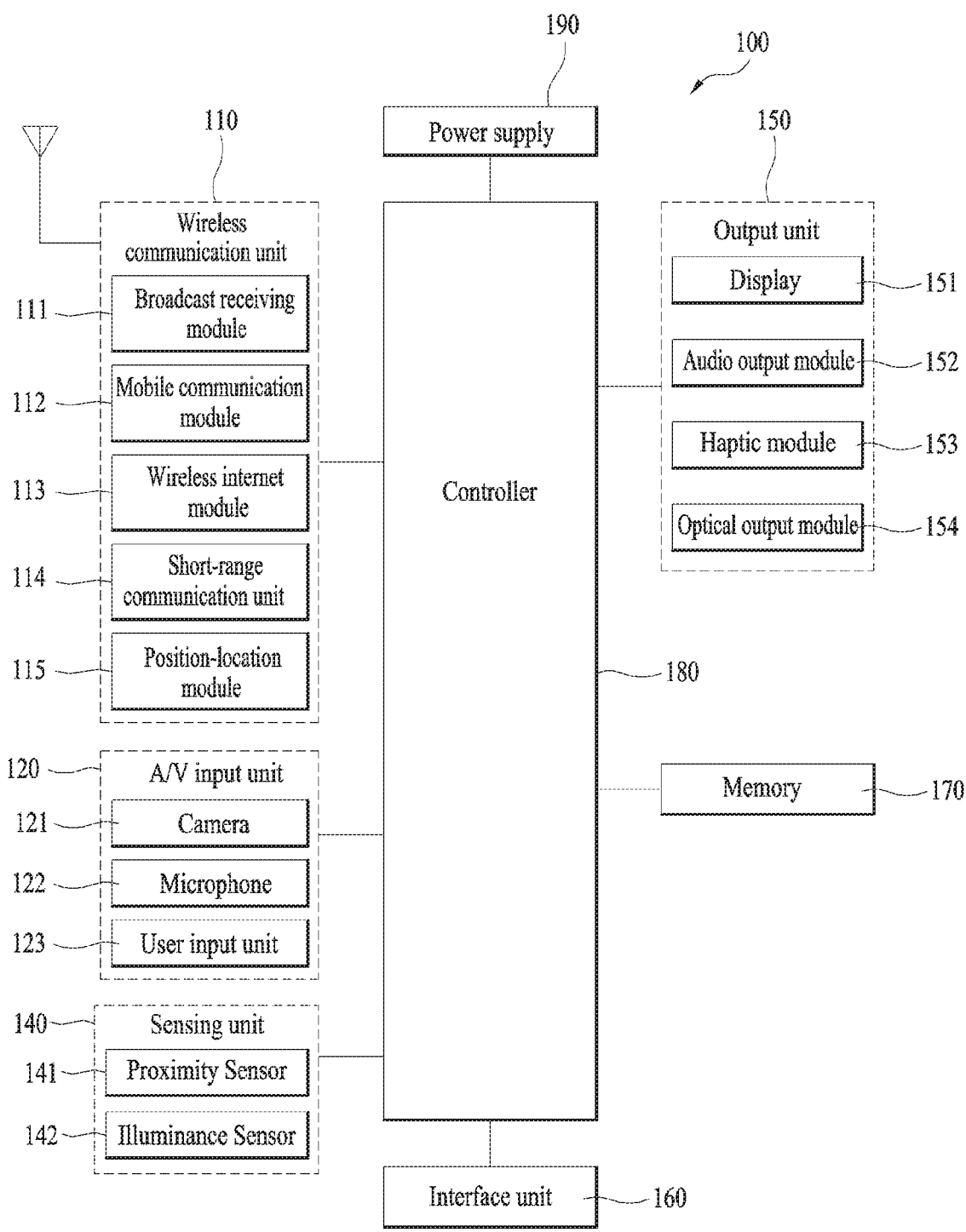
FIG. 1 is a block diagram to describe an electronic device in association with the present invention.

FIG. 1 is a block diagram to describe an electronic device in association with the present invention.

An electronic device 100 may include a wireless communication unit 110, an input unit 120, a sensing unit 140, an output unit 150, an interface unit 160, a memory 170, a controller 180, a power supply unit 190 and the like. As the components shown in FIG. 1 are not mandatory for implementation of the electronic device, the electronic device mentioned in the present specification may have components more or less than the above-listed components.

Particularly, the wireless communication unit 100 among the components may include at least one module capable of enabling a wireless communication between the electronic device 100 and a wireless communication system, between the electronic device 100 and another electronic device, between the electronic device 100 and an external server or the electronic device 100 and a personal mobility device 300. And, the wireless communication unit 110 may include at least one module configured to connect the electronic device 100 to at least one network.

The wireless communication unit 110 may include at least one of a broadcast receiving module 111, a mobile communication module 112, a wireless internet module 113, a short range communication module 114, a location information module 115 and the like.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the electronic device, the surrounding environment of the electronic device, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The electronic device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the electronic device 100 and a user, as well as function as the user input unit 123 which provides an input interface between the electronic device 100 and the user.

The interface unit 160 serves as an interface with various types of external devices that can be coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control overall operation of the electronic device 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the electronic device 100. The power supply unit 190 may include a battery, and the battery may be configured to be embedded in the electronic device body, or configured to be detachable from the electronic device body.

At least one portion of the above-mentioned components can cooperatively operate to implement operations, controls or controlling methods of the electronic device according to various embodiments mentioned in the following description. And, the operations, controls or controlling methods of the electronic device can be implemented on the electronic device by running at least one or more application programs saved in the memory 170.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

system which generates and transmits a broadcast signal and/or broadcast associated information, or a server which receives a pre-generated broadcast signal and/or broadcast associated information, and sends such items to the electronic device. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external electronic device, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device 100, communications between the electronic device 100 and the personal mobility device 300 or communications between the electronic device 100 and a network where another electronic device 100 (or an external server) is located, via wireless area networks. One example of the wireless area networks is a wireless personal area networks.

In some embodiments, another electronic device (which may be configured similarly to electronic device 100) may be a wearable device, for example, a smart watch, a smart glass or a head mounted display (HMD), which is able to exchange data with the electronic device 100 (or otherwise cooperate with the electronic device 100). The short-range communication module 114 may sense or recognize the wearable device, and permit communication between the wearable device and the electronic device 100. In addition, when the sensed wearable device is a device which is authenticated to communicate with the electronic device 100, the controller 180, for example, may cause transmission of data processed in the electronic device 100 to the wearable device via the short-range communication module 114. Hence, a user of the wearable device may use the data processed in the electronic device 100 on the wearable device. For example, when a call is received in the electronic device 100, the user may answer the call using the wearable device. Also, when a message is received in the electronic device 100, the user can check the received message using the wearable device.

The location information module 115 is generally configured to detect, calculate, derive or otherwise identify a position of the electronic device. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the electronic device.

As one example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module.

The input unit 120 may be configured to permit various types of input to the electronic device 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the electronic device 100. As another example, the cameras 121 may be located in a stereoscopic arrangement to acquire left and right images for implementing a stereoscopic image.

The microphone 122 is generally implemented to permit audio input to the electronic device 100. The audio input can be processed in various manners according to a function being executed in the electronic device 100. If desired, the microphone 122 may include assorted noise removing algorithms to remove unwanted noise generated in the course of receiving the external audio.

The user input unit 123 is a component that permits input by a user. Such user input may enable the controller 180 to control operation of the electronic device 100. The user input unit 123 may include one or more of a mechanical input element (for example, a key, a button located on a front and/or rear surface or a side surface of the electronic device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the electronic device, surrounding environment information of the electronic device, user information, or the like. The controller 180 generally cooperates with the sending unit 140 to control operation of the electronic device 100 or execute data processing, a function or an operation associated with an application program installed in the electronic device based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the electronic device 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the electronic device 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the electronic device 100. For example, the display unit 151 may display execution screen information of an application program executing at the electronic device 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the electronic device 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the electronic device 100.

An optical output module 154 can output a signal for indicating an event generation using light of a light source. Examples of events generated in the electronic device 100 may include message reception, call signal reception, a missed call, an alarm, a schedule notice, an email reception, information reception through an application, and the like.

A signal output by the optical output module 154 may be implemented in such a manner that the electronic device emits monochromatic light or light with a plurality of colors. The signal output may be terminated as the electronic device senses that a user has checked the generated event, for example.

The interface unit 160 serves as an interface for external devices to be connected with the electronic device 100. For example, the interface unit 160 can receive data transmitted from an external device, receive power to transfer to elements and components within the electronic device 100, or transmit internal data of the electronic device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the electronic device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the electronic device 100 via the interface unit 160.

When the electronic device 100 is connected with an external cradle, the interface unit 160 can serve as a passage to allow power from the cradle to be supplied to the electronic device 100 or may serve as a passage to allow various command signals input by the user from the cradle to be transferred to the electronic device there through. Various command signals or power input from the cradle may operate as signals for recognizing that the electronic device is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The electronic device 100 may also be operated in relation to a network storage device that performs the storage function of the memory 170 over a network, such as the Internet.

The controller 180 may typically control the general operations of the electronic device 100. For example, the controller 180 may set or release a lock state for restricting a user from inputting a control command with respect to applications when a status of the electronic device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the electronic device 100. The power supply unit 190 may include a battery, which is typically rechargeable or be detachably coupled to the electronic device body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

According to various embodiments of the present invention, an electronic device can project various information related to a personal mobility device on a road in a manner of being installed or combined in/with the personal mobility device. The electronic device may correspond to the aforementioned electronic device 100 or may include a partial configuration of the electronic device 100 only. Since the electronic device provides information related to a means of transportation, the electronic device may be referred to as a navigator or navigation. Yet, since the electronic device provides not only path information but also various informations, the electronic device is different from the navigator or the navigation. In the following, a configuration of the electronic device is explained with reference to FIG. 2.

Figure 2:
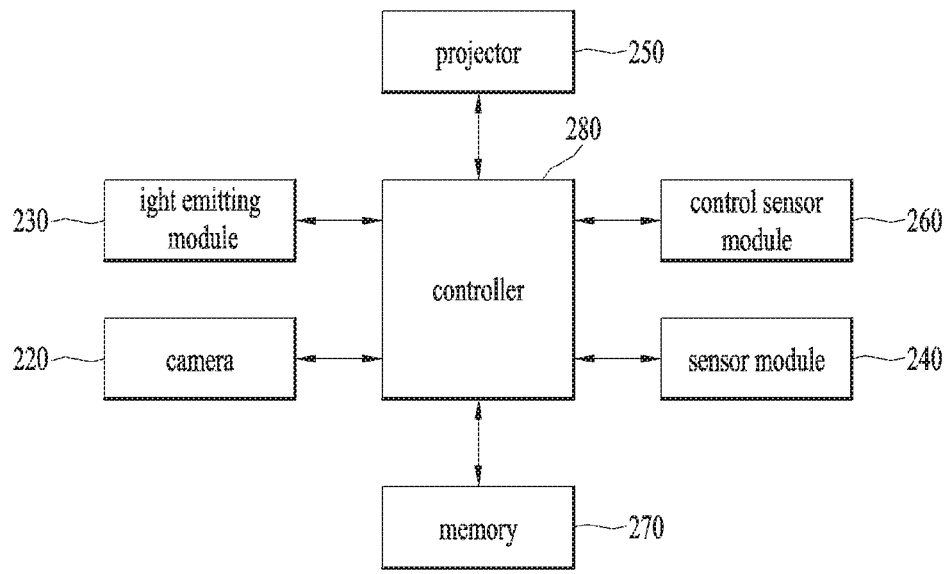
FIG. 2 is a block diagram for a configuration of an electronic device according to various embodiments of the present invention.

FIG. 2 is a block diagram for a configuration of an electronic device according to various embodiments of the present invention.

The electronic device 200 can include a camera 200, a light emitting module 230, a sensor module 240, a projector 250, a control sensor module 260, a memory 270, and a controller 280. If necessary, the electronic device 200 may include a part of the aforementioned configurations only or may further include a different configuration.

The camera 220 can capture an image. For example, the camera 220 can capture a driving direction of a personal mobility device 300 with which the electronic device 200 is combined or installed or a surrounding image. Hence, the camera 220 can capture an infrared grid projected by the IR light emitting module 230 to be described in the following.

The light emitting module 230 can project an IR (infrared) grid. For example, the light emitting module 230 can project an IR grid to a road surface of a driving direction of the personal mobility device 300 with which the electronic device 200 is combined or installed. A size of all IR grids or a size of a single grid projected by the light emitting module 230 can be configured in various ways. And, the IR light emitting module 230 can project not only an IR grid but also a grid of various wavelengths. For example, the IR light emitting module 230 can project not only an infrared light grid but also a visible ray grid and an ultraviolet ray grid.

The sensor module 240 can include one or more sensors configured to sense at least one selected from the group consisting of internal information of the electronic device 200, information on environment surrounding the electronic device 200, and user information. For example, the sensor module 240 can include at least one selected from the group consisting of a proximity sensor, an illumination sensor 142, a touch sensor, an acceleration sensor, a magnetic sensor, a G-sensor, a gyroscope sensor, a motion sensor, an RGB sensor, an infrared sensor, a finger scan sensor, an ultrasonic sensor, an optical sensor (e.g., a camera), a microphone, a battery gauge, an environment sensor (e.g., a barometer, a hygrometer, a thermometer, a radioactivity detection sensor, a heat detection sensor, a gas detection sensor, etc.), and a chemical sensor (e.g., an electronic nose, a healthcare sensor, a biometric sensor). Meanwhile, the electronic device disclosed in the present specification can utilize information sensed by at least two or more sensors among the aforementioned sensors by combining the information with each other. The sensor module 240 may correspond to the aforementioned sensing unit 140.

The projector 250 can project an image. The projector 250 can project an image to a driving direction of the personal mobility device 300 with which the electronic device 200 is combined or installed. For example, the projector 250 can project an image on a road or a side such as wall and the like. The projector 250 can manually or automatically adjust a projection direction to which an image is projected, a projection angle, and a projection distance. And, the projector 250 can emit light lighting one direction and may be able to project the image and the light lighting one direction at the same time. Hence, the projector 250 can perform not only a function of projecting an image but also a function of a headlight. Regarding this, it shall be described later.

The control sensor module 260 can recognize various inputs inputted on the electronic device 200. The control sensor module 260 can recognize a gesture of a user within a prescribed distance. For example, since the control sensor module 260 is able to emit an electromagnetic wave and receive the electromagnetic wave reflected back from an object, the control sensor module 260 is able to recognize such a movement as a gesture of a user. Hence, the control sensor module 260 can include an electromagnetic wave module for emitting an electromagnetic wave and a radar module for receiving a reflected electromagnetic wave. The control sensor module 260 can control a direction of an emitted electromagnetic wave and a distance at which the electromagnetic wave arrives. Regarding this, it shall be described later.

Meanwhile, the control sensor module 260 can be configured as a single module in a manner of being integrated with the aforementioned sensor module 240.

The memory 270 stores data supporting various functions of the electronic device 200. The memory 270 can store a plurality of application programs (applications) operated by the electronic device 200, data for operations of the electronic device 200, and commands. At least a part of the application programs can be downloaded from an external server via wireless communication. And, at least a part of the application programs may exist in the electronic device 200 from the timing at which the electronic device 200 is manufactured for a basic function (e.g., a navigation function and an information displaying function) of the electronic device 200. Meanwhile, an application program can be configured to perform an operation (or a function) by the controller 280 in a manner of being stored in the memory 270 and installed in the electronic device 200. The memory 270 may correspond to the aforementioned memory 170.

In general, the controller 280 controls overall operations of the electronic device 200 as well as the operation related to the application program. The controller 280 processes a signal, data, information and the like inputted or outputted via the aforementioned configuration elements and executes an application program stored in the memory 270 to provide appropriate information or a function to a user. A detail operation of the controller 280 shall be described later.

The electronic device 200 can be combined with a personal mobility device or can be configured as a single configuration with the personal mobility device. In the following, a configuration of the personal mobility device is described.

Figure 3:
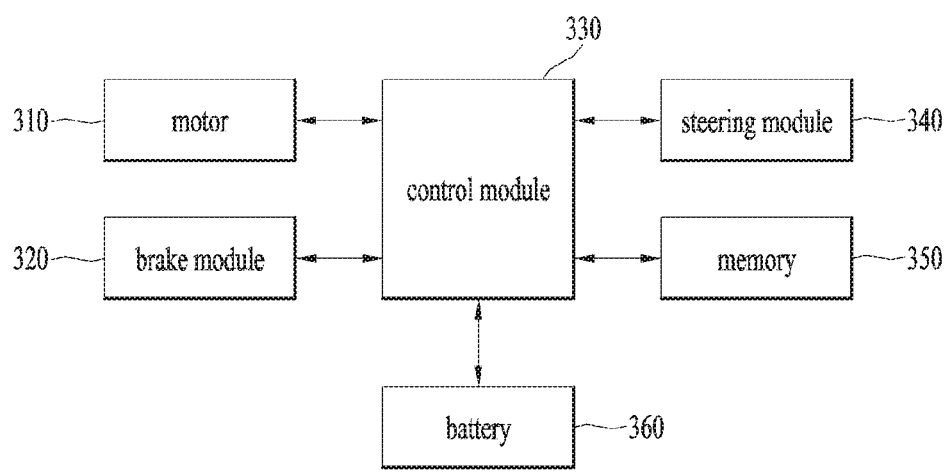
FIG. 3 is a block diagram for a configuration of a personal mobility device according to various embodiments of the present invention.

FIG. 3 is a block diagram for a configuration of a personal mobility device according to various embodiments of the present invention.

Referring to FIG. 3, a personal mobility device 300 (hereinafter, personal mobility) can include a motor 310, a brake module 320, a control module 330, a steering module 340, a memory 350, and a battery 360. It may be able to exclude a partial configuration from the personal mobility or it may be able to further include a different configuration according to a shape and an operation principle of the personal mobility device 300.

The motor 310 can generate power capable of moving the personal mobility device 300. The motor 310 may generate power by receiving power from the battery 360 to be described later or may generate power by being provided by fossil fuel. The motor 310 can be controlled by the control module 330 and power generation can be reduced or terminated by the brake module 320. The power generated by the motor 310 is delivered to a wheel 390 to be described later to move the personal mobility device 300.

The brake module 320 can make a moving speed of the personal mobility device 300 to be reduced or make the personal mobility device 300 stop. The brake module 320 can reduce the moving speed of the personal mobility device 300 or can make the movement of the personal mobility device 300 to be stopped via a wheel 390 or a brake means connected with the wheel 390. And, the brake module 320 can reduce the driving of the motor 310 or can make the driving of the motor to be stopped.

The control module 330 controls overall operations of the personal mobility device 300. For example, the control module 330 can control the personal mobility device 300 to move and control a balance of the personal mobility device 300 to be maintained. The control module 330 processes a signal, data, information and the like inputted or outputted via the aforementioned configuration elements and executes an application program stored in the memory 350 to provide appropriate information or a function to a user.

The steering module 340 can control a moving direction of the personal mobility device 300. For example, the steering module 340 can control the moving direction of the personal mobility by controlling a rotation direction of a wheel 390. The steering module 340 can control the moving direction of the personal mobility device 300 according to user interaction or a control of the control module 330. And, the steering module 340 can control the moving direction of the personal mobility device 300 for an autonomous driving according to a control of the control module 330 together with the brake module 320.

The memory 350 stores data supporting various functions of the personal mobility device 300. The memory 350 can store a plurality of applications (applications) executed in the personal mobility device 300, data for operations of the personal mobility device 300, and commands. At least a part of the application programs can be downloaded from an external server via wireless communication. And, at least a part of the application programs may exist in the personal mobility device 300 from the timing at which the personal mobility device 300 is manufactured for a basic function (e.g., a driving function and an autonomous driving function) of the personal mobility device 300. Meanwhile, an application program can be configured to perform an operation (or a function) of the electronic device by the control module 330 in a manner of being stored in the memory 350 and installed in the personal mobility device 300. The memory 350 may correspond to the aforementioned memory 170.

The battery 360 can store electric power. And, the battery 360 may store fossil fuel.

Besides the aforementioned configurations, the personal mobility device 300 can further include one of a display and a communication module configured to perform communication.

The personal mobility device 300 may correspond to a means of transportation equipped with a motor or a means of transportation moving by kinetic energy of a user without a motor. The personal mobility device 300 may correspond to a means of transportation for a single person or a means of transportation for two persons. The personal mobility device 300 can be combined with the aforementioned electronic device 200 or may include the electronic device 200. A combination between the electronic device 200 and the personal mobility device 300 is explained in the following with reference to FIG. 4.

Figure 4:
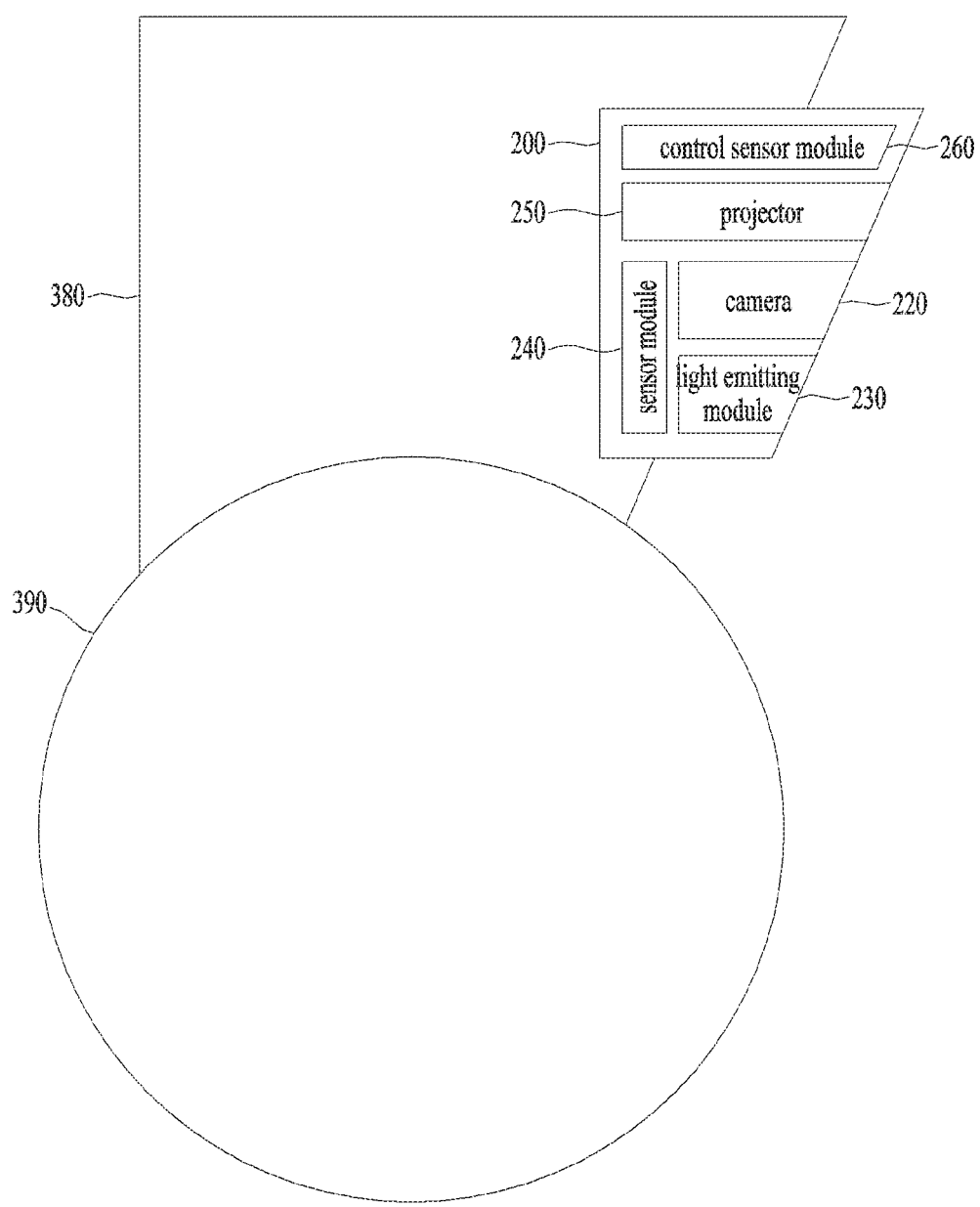
FIG. 4 is a diagram for an example of combining an electronic device and a personal mobility with each other according to various embodiments of the present invention.

FIG. 4 is a diagram for an example of combining an electronic device and a personal mobility with each other according to various embodiments of the present invention.

Referring to FIG. 4, the personal mobility device 300 can include a body 380 and a wheel 390. The body 380 can be combined with the electronic device 200. For example, the body 380 or a case of the electronic device 200 can include a clamping module for combining the electronic device and the personal mobility with each other. The body of the personal mobility device 300 and the electronic device 200 can be combined with each other via the clamping module. The clamping module may correspond to a configuration installed in at least one of the electronic device 200 and the personal mobility device 300. Or, the clamping module can be respectively connected with the electronic device 200 and the personal mobility device 300 as a separate configuration. If the electronic device 200 and the personal mobility device 300 are combined with each other, it may be able to configure the camera 220, the light emitting module 230, and the projector 250 of the electronic device 200 to face a moving direction of the personal mobility device 300. For example, the camera 200 can capture the moving direction (e.g., a front direction) of the personal mobility device 300. The light emitting module 230 can project an IR grid to a road surface of the moving direction of the personal mobility device 300. The projector 250 can project an image to the moving direction (e.g., a front direction) of the personal mobility device 300. And, the control sensor module 260 can be configured to emit an electromagnetic wave to a direction at which a gesture of a user boarding at a location corresponding to the body 380 is recognized.

Based on the aforementioned explanation, a method of operating the electronic device 200 according to various embodiments is explained in the following. The electronic device 200 may correspond to a configuration combined with the personal mobility device 300 or a configuration included in the personal mobility device 300.

Figure 5:
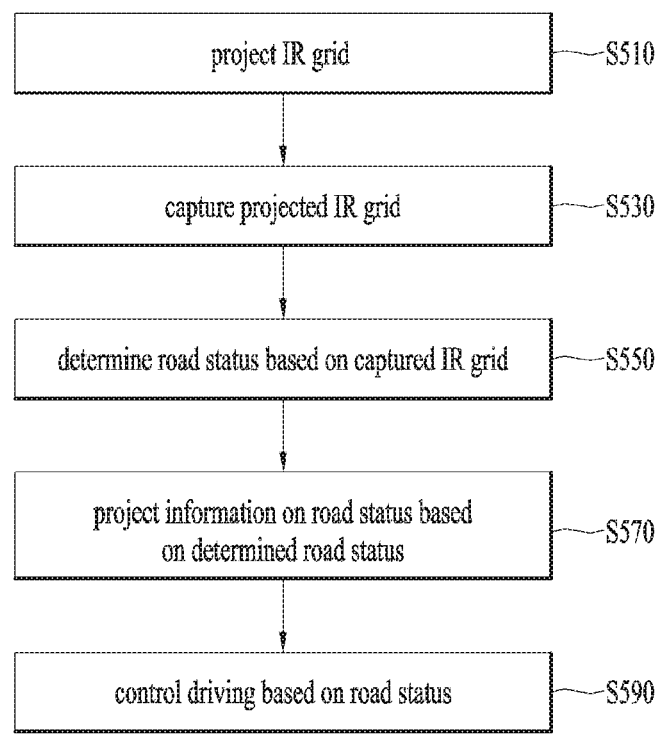
FIG. 5 is a flowchart for an electronic device to recognize a road status and project road status information according to various embodiments of the present invention.

FIG. 5 is a flowchart for an electronic device to recognize a road status and project road status information according to various embodiments of the present invention.

Referring to FIG. 5, the electronic device 200 can project an infrared grid to a road surface of a moving direction of the personal mobility device 300 combined with the electronic device 200 [S510].

For example, the light emitting module 230 can project an infrared grid to a road surface of a moving direction of the personal mobility device 300 combined with the electronic device 200. The light emitting module 230 can control a projection distance of the infrared grid according to a speed of the personal mobility device 300. For example, if the speed of the personal mobility device 300 is slow, the light emitting module 230 can project the infrared grid to a road surface within a distance close to the personal mobility device 300. If the speed of the personal mobility device 300 is fast, the light emitting module 230 can project the infrared grid to a road surface of a distance far from the personal mobility device 300. In this case, a reference distance for determining a short distance or a long distance from the personal mobility device 300 can be configured in various ways according to a selection of a user or a designer. The reference distance can be differently configured according to performance of the personal mobility device 300 or a body condition of a passenger on the personal mobility device 300.

As mentioned in the foregoing description, the light emitting module 230 can project a grid of various wavelengths as well as the IR grid and the light emitting module 230 can control a size of a grid and a space of a grid.

The electronic device 200 can capture a projected IR grid [S530].

The electronic device 200 can capture an IR grid projected to a road surface via the camera 220. For example, since the camera 220 can further include an IR filter, the camera can capture the IR grid projected to the road surface. Meanwhile, if the light emitting module 230 projects a grid of a different wavelength rather than the IR grid, the camera 220 may further include a filter corresponding to the projected wavelength.

The electronic device 200 can determine a road status based on the captured IR grid [S550].

The controller 280 of the electronic device 200 can determine a road status of a road surface to which the IR grid is projected based on the captured grid. For example, when the IR grid is projected with a uniform space and a size, if the projected IR grid is not maintained, the controller 280 can determine it as there is a problem in the road status. In this case, the problem on the road status may indicate that there is a barrier or a bump on the road. Specifically, if a size of the captured grid is not uniform or a part of the grid is not captured, the controller 280 can determine it as the road status is not flat. Regarding this, it is explained with reference to FIGS. 6 to 7 in the following.

Figure 6:
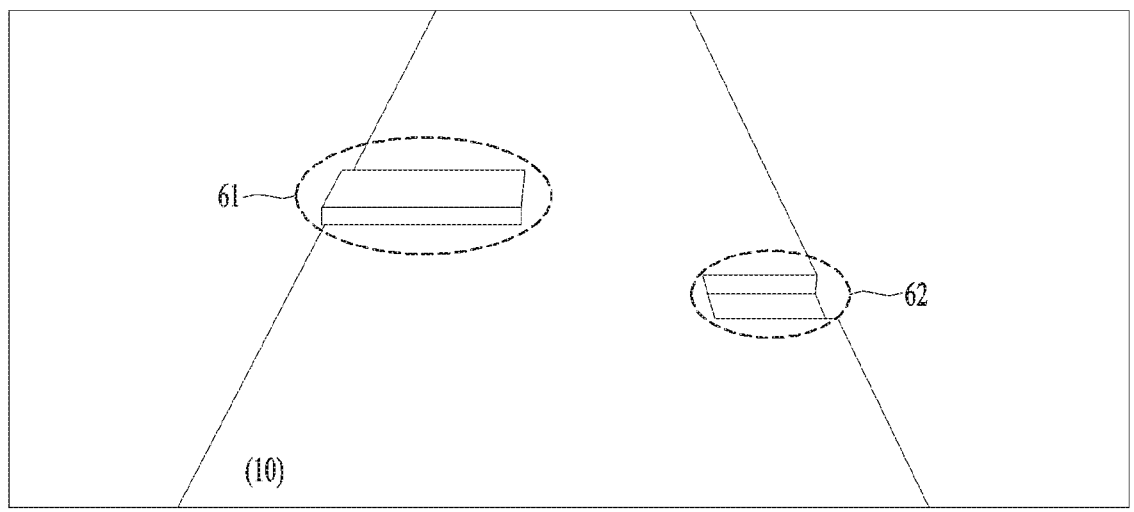
FIG. 6 is a diagram for a road surface according to various embodiments of the present invention.

FIG. 6 is a diagram for a road surface according to various embodiments of the present invention.

Referring to FIG. 6, a road 10 may have a concave area or a convex area compared to other areas. For example, there may exist a protrusive part such as a convex part 61 and a sunken part such as a concave part 62. The convex part 61 may correspond to a part at which a barrier is located or a protrusive part of the road. The concave part 62 may correspond to a sinkhole of the road.

Figure 7:
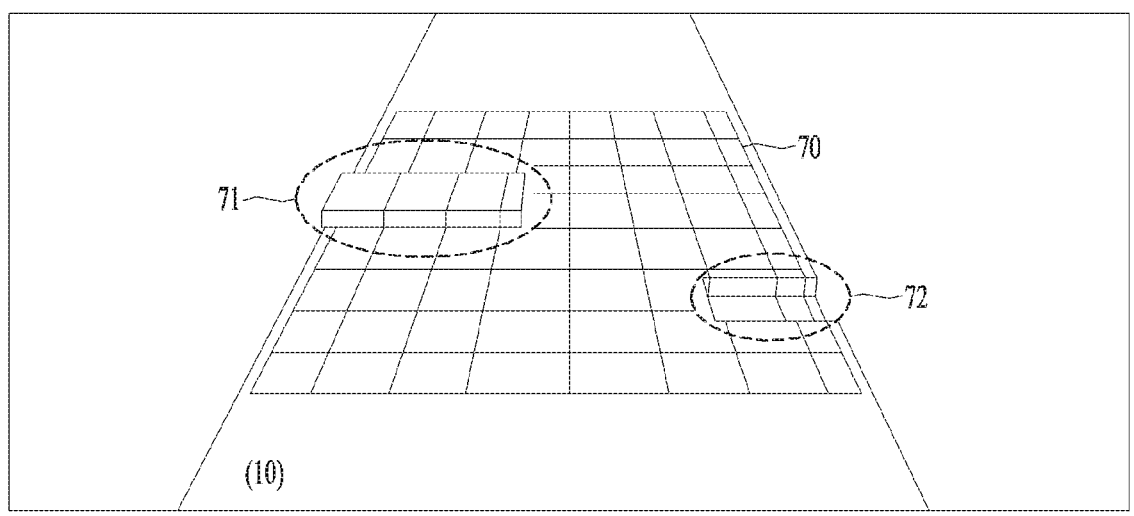
FIG. 7 is a diagram for a captured IR grid according to various embodiments of the present invention.

FIG. 7 is a diagram for a captured IR grid according to various embodiments of the present invention.

Referring to FIG. 7, the camera 220 can capture an IR grid 70 projected to a road 10. The controller 280 can recognize an area in which a shape of the grid is not maintained in the captured IR grid 70. For example, the controller 280 can recognize a first area 71 and a second area 72 in which the shape of the projected IR grid is not maintained. In this case, the first area 71 may correspond to an area corresponding to the aforementioned convex part 61 and the second area 72 may correspond to an area corresponding to the aforementioned concave part 62. Hence, it is able to check that the shape of the IR grid projected to the first area 71 is changed to a shape corresponding to the convex part 61 and it is also able to check that the shape of the IR grid projected to the second area 72 is changed to a shape corresponding to the concave part 62. Hence, the controller 280 can determine the first area 71 as a protrusive part compared to other areas and determine the second area 72 as a sunken part compared to other areas. By doing so, the controller 280 can determine the convex part 61 corresponding to the first area 71 and the concave part 62 corresponding to the second area 72 as a risky area on the road 10. In this case, the risky area may correspond to a dangerous area capable of influencing on the driving of the personal mobility device 300.

Meanwhile, the electronic device 200 according to various embodiments can control sensitivity (e.g., a reference for determining whether or not there is a problem) for determining whether or not there is a problem on a road status and may be then able to determine existence or non-existence of a problem on a road status base on the controlled sensitivity.

As an embodiment, the electronic device 200 can control the sensitivity for determining whether or not there is a problem on the road status based on a driving history of the personal mobility device 300. For example, the electronic device 200 can control the sensitivity for determining whether or not there is a problem on the road status, based on frequency of reducing speed of the personal mobility device 300, a slowing down distance, amount of reduced speed, and the like when the personal mobility passes through a dangerous area.

As a different embodiment, when the electronic device 200 passes through a dangerous area, the electronic device 200 can control the sensitivity for determining whether or not there is a problem on the road status based on a value sensed by the sensor module 230. For example, when the electronic device 200 passes through a dangerous area, the electronic device 200 detects a Z axis movement sensed by the sensor module 230 as a vibration and can control the sensitivity for determining whether or not there is a problem on the road status based on the detected Z axis movement.

As a further different embodiment, the electronic device 200 can control the sensitivity for determining whether or not there is a problem on the road status based on performance or characteristics of the personal mobility device 300. Since a vibration or a disorder, which occurs at the time of passing thorough an identical dangerous area, varies depending on performance or characteristic of the personal mobility device 300, the electronic device 200 can control the sensitivity for determining whether or not there is a problem on the road status based on the performance or the characteristic of the personal mobility device 300. In this case, the performance or the characteristic of the personal mobility device 300 can include various characteristics related to the personal mobility device 300 including a driving type, number of wheels, maximum speed, buffer performance, brake capability, and the like of the personal mobility device 300.

As a further different embodiment, the electronic device 200 can control the sensitivity for determining whether or not there is a problem on the road status based on passenger information of the personal mobility device 300. For example, the electronic device 200 can control the sensitivity for determining whether or not there is a problem on the road status based on body information of a passenger on the personal mobility device 300 such as height, weight, and the like of the passenger. As an example, if the weight of the passenger is heavy, the electronic device 200 may increase the sensitivity. On the contrary, if the weight of the passenger is light, the electronic device 200 may decrease the sensitivity.

As a further different embodiment, the electronic device 200 can control the sensitivity for determining whether or not there is a problem on the road status based on a speed of the personal mobility device 300. For example, if the speed of the personal mobility device 300 is slow, the electronic device 200 may decrease the sensitivity. On the contrary, if the speed of the personal mobility device 300 is fast, the electronic device 200 may increase the sensitivity.

As a further different embodiment, the electronic device 200 can control the sensitivity for determining whether or not there is a problem on the road status based on a type of a road surface or a gradient of the road surface on which the personal mobility device 300 moves. For example, if the type of the road surface on which the personal mobility device 300 moves is not appropriate for the movement of the personal mobility device 300, the electronic device 200 may increase the sensitivity. And, if the gradient of the road is steep, the electronic device 200 may increase the sensitivity.

As mentioned in the foregoing description, the electronic device 200 can control the sensitivity for determining whether or not there is a problem on the road status based on at least one selected from the group consisting of a driving history of the personal mobility device 300, performance and characteristic of the personal mobility device 300, a value sensed by the electronic device 200, and passenger information. Hence, the electronic device 200 can determine whether or not there is a problem on a road status with sensitivity appropriate for the personal mobility device 300 on which the electronic device 200 is mounted and a passenger.

The aforementioned explanation on the sensitivity control is just an example only. The present invention is not restricted by the example. Various embodiments for the sensitivity control can be implemented not only by each embodiment but also by a combination of a plurality of embodiments.

Determining a dangerous area based on sensitivity control of an electronic device according to various embodiments is explained in the following with reference to FIG. 8.

FIG. 8 is a diagram for an example of recognizing a dangerous area based on sensitivity adjustment according to various embodiments of the present invention.

Referring to FIG. 8, there may exist a plurality of dangerous areas 81/82/83/84 on a road 20. Each of a plurality of the dangerous areas may correspond to a dangerous area including a sunken part or a protrusive part different from each other. As an embodiment, if the sensitivity for determining whether or not there is a problem on a road status is high, the electronic device 200 can determine a first dangerous area 811, a second dangerous area 812, a third dangerous area 813, and a fourth dangerous area 814 as dangerous areas based on a captured image of an IR grid 810 projected to the road 20. As a different embodiment, if the sensitivity for determining whether or not there is a problem on a road status is low, the electronic device 200 can determine a first dangerous area 821 as a dangerous area only based on a captured image of an IR grid 820 projected to the road 20. In this case, an area of the first dangerous area 821 may be smaller than an area of the first dangerous area 811. As mentioned above, determination of a dangerous area can be differently performed for an identical road depending on a sensitivity configuration. Moreover, the extent of disorder of a dangerous area or an area of a dangerous area can be differently determined in response to an identical dangerous area 811/821.

Refer to FIG. 5 again.

Referring to FIG. 5, the electronic device 200 can project information on a road status to a road based on a determined road status [S570].

The controller 280 of the electronic device 200 can project the information on the road status to the road of a moving direction of the personal mobility device 300 based on the determined road status via the projector 250. In this case, the information on the road status may include information on a dangerous area of the road.

As an embodiment, the electronic device 200 can project an image of a determined dangerous area with a color distinguished from a color of a different area or may project a flickering image for a determined dangerous area.

The electronic device 200 can project an image of a different color according to a type of a dangerous area. For example, if a dangerous area corresponds to a convex area, the electronic device 200 can project an image of a first color. If a dangerous area corresponds to a concave area, the electronic device 200 can project an image of a second color. If a dangerous area corresponds to a barrier, the electronic device 200 can project an image of a third color.

An image projected by the electronic device 200 in response to a dangerous area is explained in detail with reference to FIGS. 9 to 10 in the following.

Figure 9:
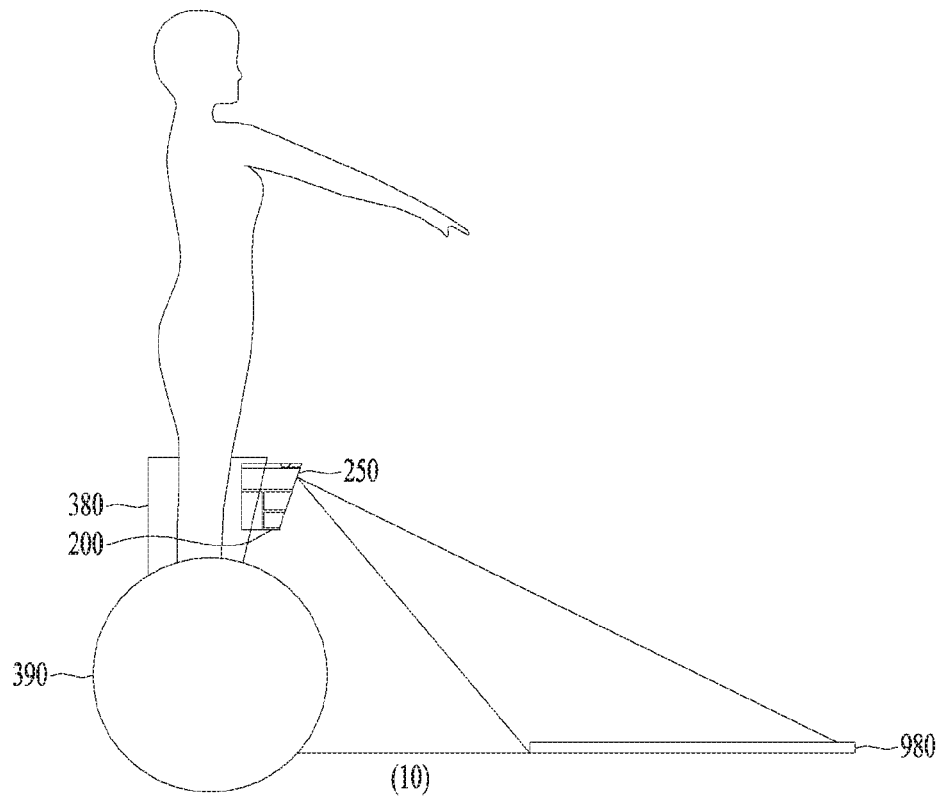
FIG. 9 is a diagram of an example for an electronic device to project an image according to various embodiments of the present invention.

FIG. 9 is a diagram of an example for an electronic device to project an image according to various embodiments of the present invention.

Referring to FIG. 9, the electronic device 200 can be combined with the personal mobility device 300. The projector 250 of the electronic device 200 can project an image 980 to a road of a moving direction of the personal mobility device 300. In this case, a size of the projected image 980 and a distance between the projected image 980 and the electronic device 200 can be controlled. And, the projector 250 can project not only an image but also light to the front like a headlight. Hence, the projector 250 can project light as a headlight and an image of information on a road at the same time.

Figure 10:
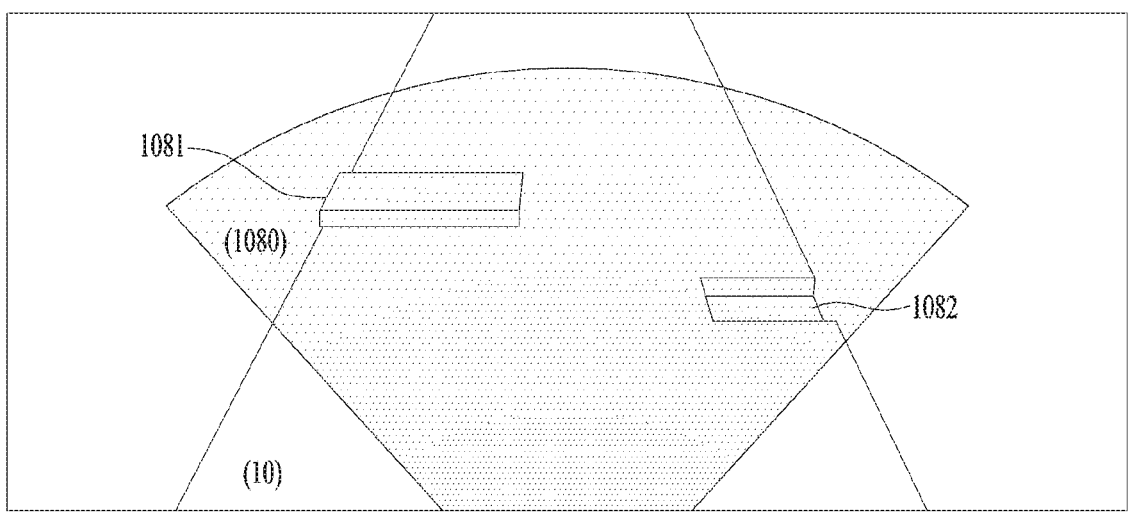
FIG. 10 is a diagram for an example of a projected image according to various embodiments of the present invention.

FIG. 10 is a diagram for an example of a projected image according to various embodiments of the present invention.

Referring to FIG. 10, the projector 250 of the electronic device 200 can project an image 1080 to a road 10. In this case, the image 1080 can include information related to the road and light as a headlight. The controller 280 can project a first image 1081 to a first area 71 corresponding to a dangerous area determined on the road 10 and project a second image 1082 to a second area 72. In this case, the first image 1081 and the second image 1082 may correspond to an image including at least one selected from the group consisting of color, brightness, and flickering distinguished from other area of the image 1080. And, the first image 1081 and the second image 1082 may have a color different from each other. For example, the first image 1081 may have a first color corresponding to a convex area and the second image 1082 may have a second color corresponding to a concave area. By doing so, a passenger of the personal mobility device 300 can recognize the dangerous areas 71/72 on the road 10 of the moving direction of the personal mobility based on the projected images 1080/1081/1082. And, the passenger can recognize that each of the dangerous areas 71/72 corresponds to a convex area and a concave area, respectively.

The electronic device 200 can inform a passenger on the personal mobility device 300 of the determined dangerous area via various methods as well as the aforementioned projected image. For example, the electronic device 200 can output an alarm sound via a speaker (not depicted) or may make a vibration module (not depicted) vibrate to indicate a dangerous area.

Meanwhile, the electronic device 200 can control a projection distance of a projected image in response to a speed of the personal mobility device 300. Regarding this, it shall be described later.

Refer to FIG. 5 again.

The electronic device 200 can control the driving of the personal mobility device 300 based on a determined road status [S590].

The controller 280 of the electronic device 200 can control the driving of the personal mobility device 300 in response to a determined dangerous area. For example, the electronic device 200 can control the personal mobility device 300 to reduce speed of the personal mobility device 300 or drive in a manner of avoiding a dangerous area before the personal mobility passes through the dangerous area. For example, the controller 280 can control the personal mobility device 300 by controlling at least one selected from the group consisting of the motor 310, the brake module 320, and the steering module of the personal mobility device 300 and the controller 280 can control the control module 330 to control different configurations of the personal mobility device 300.

The electronic device 200 according to various embodiments can control a projection distance of an image related to driving information to be projected to a road in response to a moving speed of the personal mobility device 300.

Figure 11:
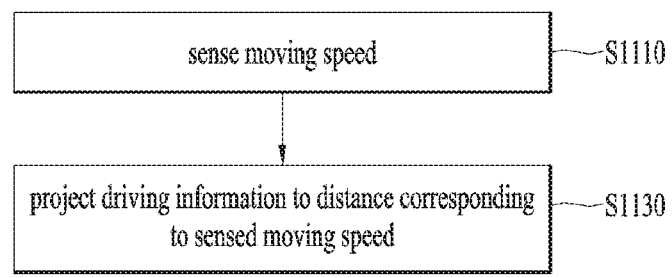
FIG. 11 is a flowchart for a method of controlling a projection distance based on a moving speed according to various embodiments of the present invention.

FIG. 11 is a flowchart for a method of controlling a projection distance based on a moving speed according to various embodiments of the present invention.

Referring to FIG. 11, the electronic device 200 can detect a moving speed of the personal mobility device 300 [S1110].

The controller 280 of the electronic device 200 can detect a moving speed of the personal mobility device 300 based on a value sensed by the sensor module 240. For example, the controller 280 can detect the moving speed of the personal mobility device 300 using Doppler shift of a GPS signal. And, the controller 280 can detect the moving speed of the personal mobility device 300 based on acceleration sensed by an acceleration sensor or may be able to detect the moving speed of the personal mobility device 300 based on a GPS signal measured by a GPS module and moving time.

The electronic device 200 can project driving information to a distance corresponding to the detected moving speed [S1130].

The controller 280 of the electronic device 200 can project driving information to a distance corresponding to the detected moving speed on a road of a moving direction of the personal mobility device 300. For example, if the moving speed of the personal mobility device 300 is slow, the electronic device 200 can project driving information to a road of a distance close to the personal mobility device 300. On the contrary, if the moving speed of the personal mobility device 300 is fast, the electronic device 200 can project the driving information to a road of a distance far from the personal mobility device 300. If the moving speed of the personal mobility device 300 is equal to or faster than a prescribed speed, the electronic device 200 may not project the driving information. In particular, the electronic device 200 can variably project the driving information according to the moving speed of the personal mobility device 300. If the moving speed of the personal mobility device 300 is very fast, the electronic device 200 may not project the driving information to prevent a gaze of a passenger from being distracted. Regarding this, it is explained with reference to FIG. 12 in the following.

FIG. 12 is a diagram for an example of projecting an image to a distance corresponding to a moving speed according to various embodiments of the present invention.

Referring to FIG. 12 (a), if a speed of the personal mobility device 300 corresponds to a first speed, the electronic device 200 can project an image 1210 to a distance of which a distance with the personal mobility device 300 is less than d1. In this case, the first speed may correspond to a speed slower than a first reference speed for projecting an image within the d1 from the personal mobility device 300.

Referring to FIG. 12 (b), if the speed of the personal mobility device 300 corresponds to a second speed, the electronic device 200 can project an image 1210 to a distance of which a distance with the personal mobility device 300 is equal to or greater than the d1 and the distance shorter than d1+d2. In this case, the second speed may correspond to a speed faster than the first reference speed for projecting an image within the d1 from the personal mobility device 300 and the speed slower than a second reference speed for not projecting an image.

Referring to FIG. 12 (c), if the speed of the personal mobility device 300 corresponds to a third speed, the electronic device 200 may not project an image 1210. In this case, the third speed may correspond to a speed faster that the second reference speed for not projecting an image.

Explanation on the embodiment of projecting an image to a distance corresponding to a moving speed is just an example only. The present invention may be non-limited by the example. Hence, the first reference speed, the second reference speed, the distance d1, and the distance d2 can be configured in various ways according to a selection of a user or a designer. A step of a projection distance can also be configured in various ways.

According to various embodiments, the electronic device 200 determines a braking distance of the personal mobility device 300 based on at least one of performance of the personal mobility device 300 and body information of a user and can control a projection distance of driving information based on the determined braking distance.

Figure 13:
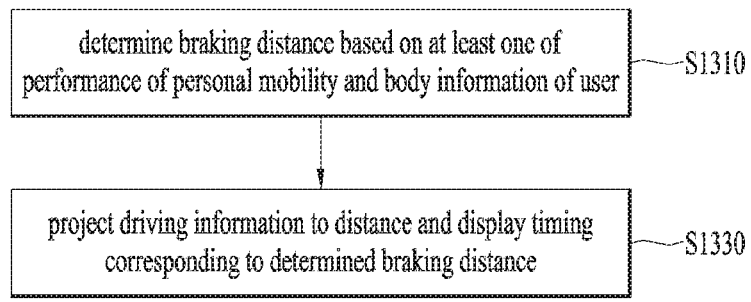
FIG. 13 is a flowchart for operations of determining a braking distance and adjusting a projection distance according to various embodiments of the present invention.

FIG. 13 is a flowchart for operations of determining a braking distance and adjusting a projection distance according to various embodiments of the present invention.

Referring to FIG. 13, the electronic device 200 can determine a braking distance of the personal mobility device 300 based on at least one of performance of the personal mobility device 300 and body information of a user [S1310].

The controller 280 of the electronic device 200 can determine a braking distance of the personal mobility device 300 based on performance of the personal mobility device 300 including moving performance of the personal mobility device 300 such as driving performance, steering performance, and brake performance and a physical specification of the personal mobility device 300 such as a length, a width, a height, a weight, etc. Hence, the electronic device 200 can operate in consideration of the braking distance of the personal mobility device 300 according to the performance of the personal mobility device 300.

And, the controller 280 of the electronic device 200 can also determine the braking distance of the personal mobility device 300 based on the aforementioned performance of the personal mobility device 300 and body information of a user.

The electronic device 200 can project driving information to a distance corresponding to the determined braking distance and display timing [S1330].

The controller 280 of the electronic device 200 can project various information related to the driving of the personal mobility device 300 to a road in consideration of the determined braking distance of the personal mobility device 300. For example, if it is determined as the braking distance of the personal mobility device 300 is longer than a reference distance, the controller 280 of the electronic device 200 makes display timing to be faster than reference timing and makes a projection distance to be longer than the reference distance. On the contrary, if it is determined as the braking distance of the personal mobility device 300 is shorter than the reference distance, the controller 280 of the electronic device 200 makes the display timing to be slower than reference timing and can make the projection distance to be shorter than the reference distance. In this case, various informations related to the driving of the personal mobility device 300 can include information on the aforementioned dangerous area, information on a driving path, information on a driving speed, information on a status of the personal mobility device 300, and the like.

As mentioned in the foregoing description, the electronic device 200 can project the information related to the driving of the personal mobility device 300 to the road at the projection distance corresponding to the determined braking distance and the display timing. And, the electronic device 200 can project the information related to the driving of the personal mobility device 300 to the road at the projection distance corresponding to the determined braking distance or the display timing. Hence, since it is able for a user of the personal mobility device 300 to check the information related to the driving of the personal mobility at appropriate timing, the user may have sufficient time for performing such an operation as path changing, avoiding a dangerous area, and reducing speed.

The electronic device 200 according to various embodiments can recognize a gesture of a user and perform a function or an operation based on the recognized gesture.

Figure 14:
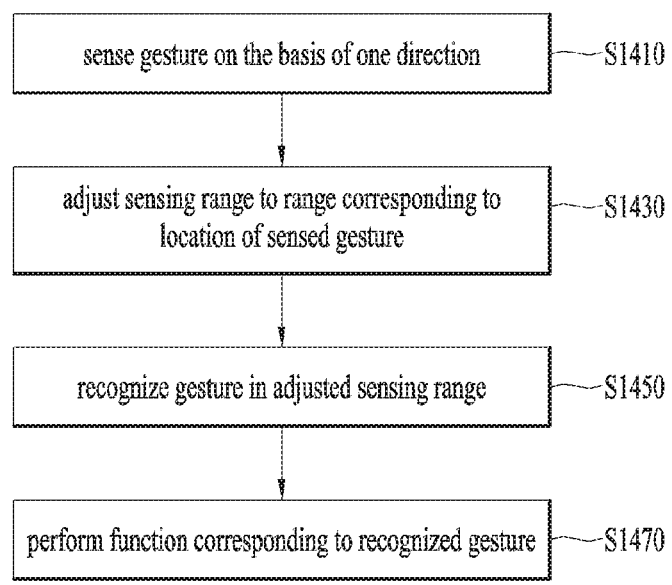
FIG. 14 is a flowchart for operations of recognizing a gesture and performing a function based on the recognized gesture according to various embodiments of the present invention.

FIG. 14 is a flowchart for operations of recognizing a gesture and performing a function based on the recognized gesture according to various embodiments of the present invention.

Referring to FIG. 14, the electronic device 200 can sense a gesture of a user on the basis of one direction [S1410].

The control sensor module 260 of the electronic device 200 emits an electromagnetic wave to one direction and can receive the emitted electromagnetic wave reflected back from a hand making a gesture. By doing so, the control sensor module 260 can sense a gesture of a user and the controller 280 can recognize the gesture of the user based on the sensed gesture. In this case, one direction corresponds to a direction determined in advance and the direction may correspond to a direction at which the hand making the gesture is located. For example, one direction may correspond to a direction at which a hand making a gesture is most likely located based on a numerical value for a standard body. Or, one direction may correspond to a direction at which a hand making a gesture is most likely located based on a numerical value inputted to body information of a user. And, one direction may correspond to a direction for scanning a hand of a user that makes a gesture. Regarding this, it is explained in the following with reference to FIGS. 15 to 16.

Figure 15:
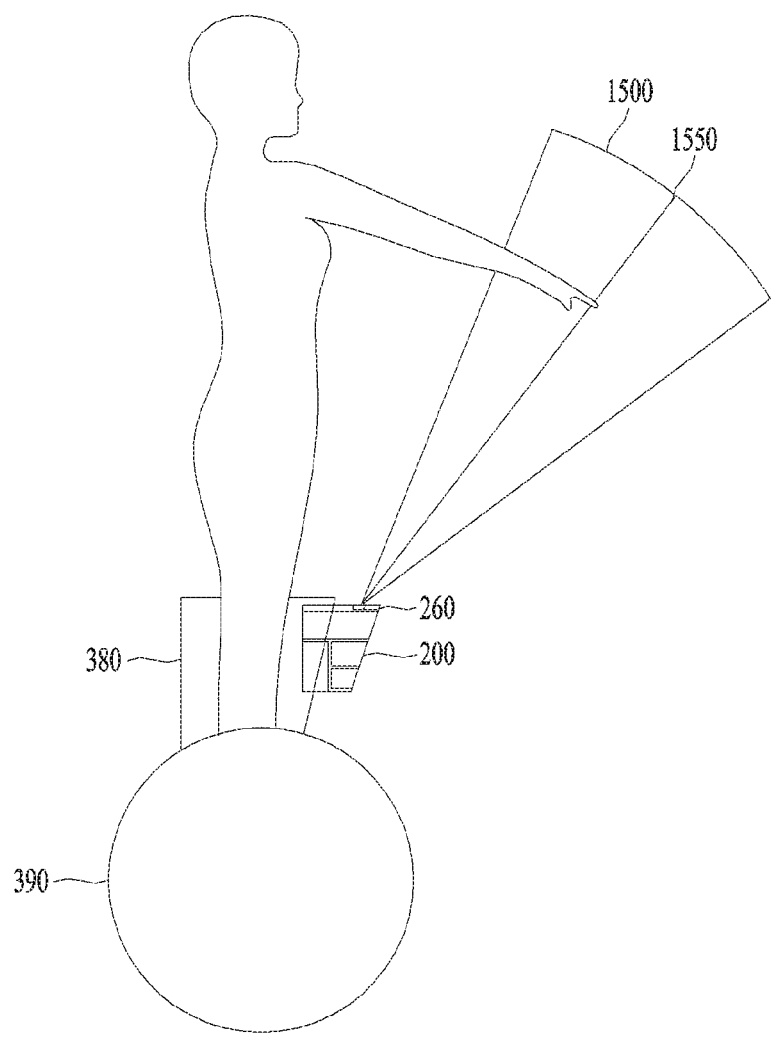
FIG. 15 is a diagram for an example of recognizing a gesture according to various embodiments of the present invention.

FIG. 15 is a diagram for an example of recognizing a gesture according to various embodiments of the present invention.

Referring to FIG. 15, the control sensor module 260 of the electronic device 200 can emit an electromagnetic wave 1500 on the basis of a center line 1550 to a direction at which a hand of a user on the personal mobility device 300 is most likely located based on one direction, e.g., a numerical value for a standard body. In this case, the control sensor module 260 can emit the electromagnetic wave 1500 in a radial form. The control sensor module 260 can receive the emitted electromagnetic wave 1500 reflected back from a hand of a user, e.g., a hand making a gesture. As one embodiment, the gesture may correspond to a gesture that a user rubs his thumb and an index finger. By doing so, the control sensor 260 can sense a gesture. Specifically, the control sensor 260 can recognize a moving speed, a direction, the extent of contact, and the like of a gesture made by a hand of a user.

As an embodiment, the electronic device 200 can determine an initial direction of an electromagnetic wave 1500 based on data of a standard body and may be able to emit the electromagnetic wave 1500 to the determined direction. And, the electronic device 200 determines a direction of the electromagnetic wave 1500 based on a standard body data per country, age, gender, and the like and may be able to emit the electromagnetic wave 1500 to the determined direction.

Meanwhile, the electronic device 200 can scan a hand of a user making a gesture in one direction.

Figure 16:
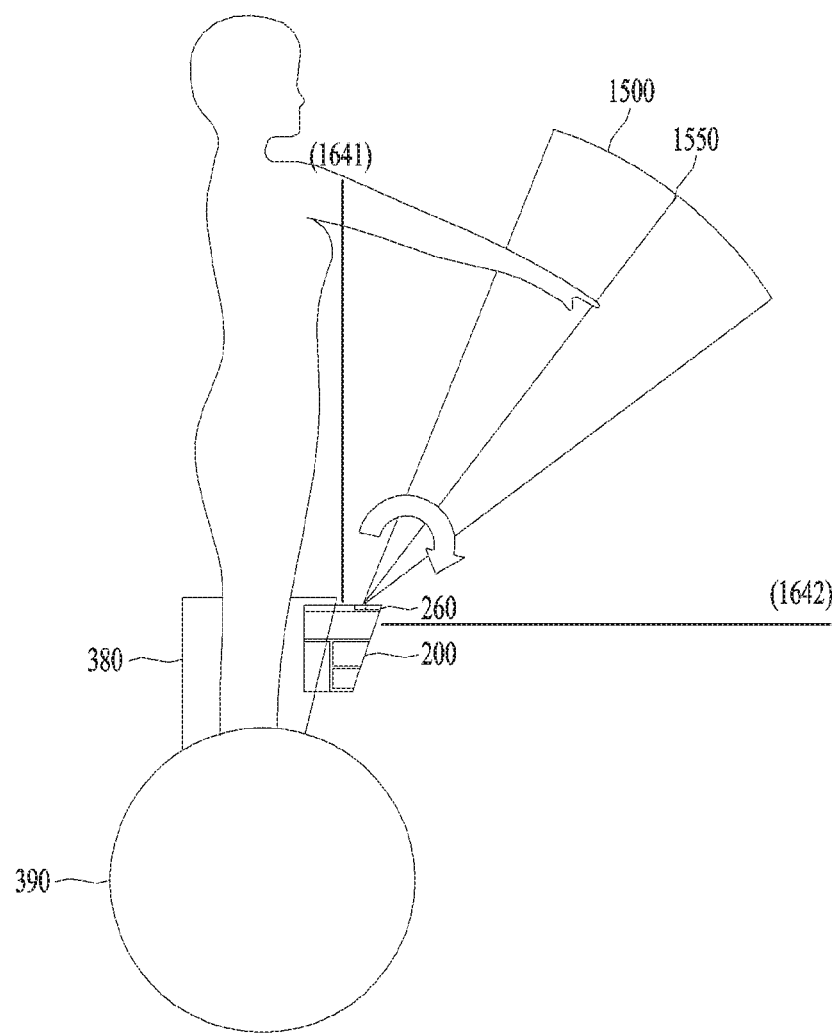
FIG. 16 is a diagram for an example of a scan operation for recognizing a gesture according to various embodiments of the present invention.

FIG. 16 is a diagram for an example of a scan operation for recognizing a gesture according to various embodiments of the present invention.

Referring to FIG. 16, the electronic device 200 can make the electromagnetic wave 1500 emitted by the control sensor module 260 to be sequentially moved from a first position 1641 to a second position 1642. And, the electronic device 200 can make the electromagnetic wave 1500 emitted by the control sensor module 260 to be sequentially moved from the second position 1642 to the first position 1641. Hence, the control sensor module 260 can receive the electromagnetic wave, which is sequentially emitted from the first position 1641 to the second position 1642 or from the second position 1642 to the first position 1641, reflected back from a hand of a user making a gesture. The control sensor module 260 can recognize a precise location of the hand of the user based on the received reflected wave. For example, the control sensor module 260 can recognize a location at which most of reflected waves of the sequentially emitted electromagnetic waves are located as a location of a hand. By doing so, the electromagnetic device 200 can recognize a precise location at which a hand of a user, e.g., a hand making a gesture, is located.

Refer to FIG. 14 again.

The electronic device 200 can adjust a sensing range to a range corresponding to a location of a sensed gesture [S1430].

The controller 280 of the electronic device 200 can adjust a sensing range to a range corresponding to a location of a sensed gesture and a location of a hand of a user. For example, the controller 280 can adjust a range of an electromagnetic wave 1500 emitted by the control sensor module 260.

Regarding this, it is explained in the following with reference to FIGS. 17 to 18.

Figure 17:
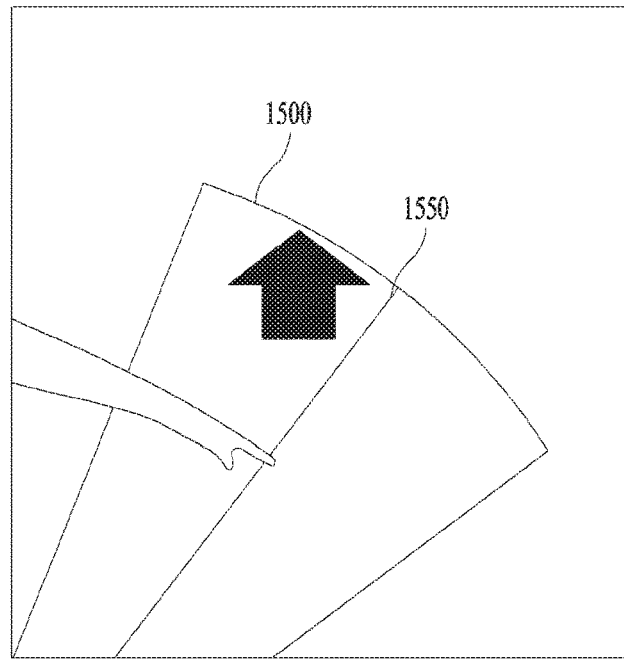
FIGS. 17 to 18 are diagrams for an example of adjusting a sensing range according to various embodiments of the present invention.
Figure 18:
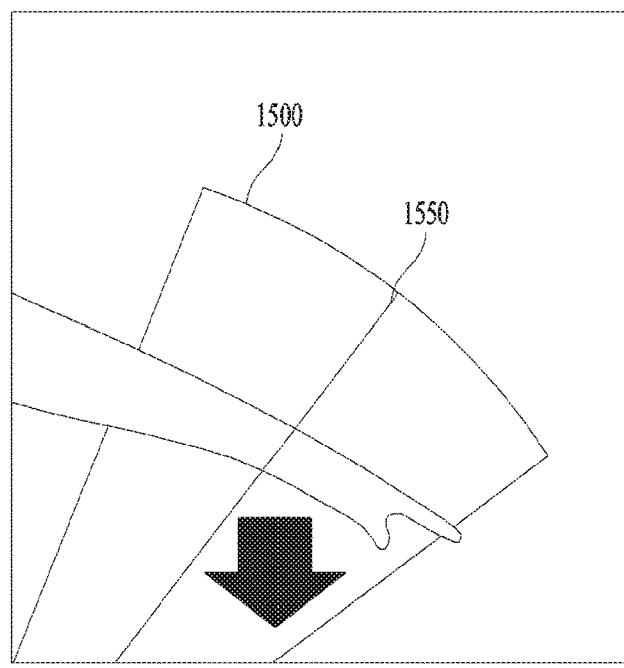

FIGS. 17 to 18 are diagrams for an example of adjusting a sensing range according to various embodiments of the present invention.

Referring to FIG. 17, if a location of a sensed gesture is higher than a center line 1550 of an emitted electromagnetic wave 1500, the electromagnetic device 200 can adjust the center line 1550 of the electromagnetic wave 1500 to up direction to make the center line 1550 correspond to the location of the sensed gesture. By doing so, it may be able to make the center line 1550 of the electromagnetic wave 1500 emitted by the control sensor module 260 to be adjusted to the sensed gesture, e.g., the location of the hand of the user.

Referring to FIG. 18, if a location of a sensed gesture is lower than a center line 1550 of an emitted electromagnetic wave 1500, the electromagnetic device 200 can adjust the center line 1550 of the electromagnetic wave 1500 to down direction to make the center line 1550 correspond to the location of the sensed gesture. By doing so, it may be able to make the center line 1550 of the electromagnetic wave 1500 emitted by the control sensor module 260 to be adjusted to the sensed gesture, e.g., the location of the hand of the user.

Meanwhile, in order to adjust a sensing range and scan a gesture, the control sensor module 260 according to various embodiments can include a structure and a configuration for changing a range of an electromagnetic wave 1500 emitted by the control sensor module 260.

FIG. 19 is a diagram for a configuration of a control sensor module according to various embodiments of the present invention.

Referring to FIG. 19, the control sensor module 260 can include a radar sensor 261, a first rotor 263, a second rotor 264, and a servo motor 265.

The radar sensor 261 emits an electromagnetic wave and can receive a reflected wave according to the emitted electromagnetic wave. The radar sensor 261 emits an electromagnetic wave according to the rotation of the first rotor 263 and the second rotor 264 and can control a direction for receiving a reflected wave.

The first rotor 263 is connected with the radar sensor 261 and may be able to rotate to control emission of the electromagnetic wave emitted by the radar sensor 261 and the direction for receiving the reflected wave.

The second rotor 264 can rotate based on power delivered from the servo motor 265 and can deliver the rotation to the first rotor 263.

The first rotor 263 and the second rotor 264 can be configured as a single rotor or a plurality of rotors.

The servo motor 265 may operate according to the control of the control sensor module 260 or the controller 280 and may be able to make the second motor 264 rotate.

The electronic device 200 controls the servo motor 265 to rotate and controls emission of the electromagnetic wave emitted by the radar sensor 261 and the direction for receiving the reflected wave. By doing so, as mentioned in the foregoing description, the electronic device 200 can adjust a sensing range for sensing a gesture and perform an operation for scanning a gesture.

Meanwhile, the control sensor module 260 can control emission of an electromagnetic wave and a reflected wave reception direction based on such a manual input as a user interaction without such an actuator as the servo motor 265.

FIG. 20 is a diagram for an example of a manual rotation of a radar sensor according to various embodiments of the present invention.

Referring to FIG. 20, the control sensor module 260 can be connected with a dial button 2040/20141/2042 and can control emission of an electromagnetic wave emitted by the radar sensor 261 and a reflected wave reception direction according to the rotation of the dial button. And, heights or reference numbers are written on the dial button 2041/2042 and a user can control emission of an electromagnetic wave emitted by the radar sensor 261 and a reflected wave reception direction by operating the heights or the reference numbers written on the dial button.

Referring to FIG. 20 (*a*), numerical values for reference heights are written on a dial button 2041. A user rotates the dial button 20141 to make a numerical value close to a height of the user arrive at a reference marker 2050 and the user can adjust the emission of the electromagnetic wave emitted by the radar sensor 261 and the reflected wave reception direction to a location of a hand of the user.

Referring to FIG. 20 (*b*), reference numbers are written on the dial button 20141. A user rotates the reference numbers to make a numerical value close to a height of the user arrive at a reference marker 2050 and the user can adjust the emission of the electromagnetic wave emitted by the radar sensor 261 and the reflected wave reception direction to a location of a hand of the user.

A specific operation for adjusting the radar sensor 261 using the dial button 2040/2041/2042 is explained with reference to FIG. 20 (c) in the following.

Referring to FIG. 20 (c), if the dial button 2040 rotates, the second rotor 264 and the first rotor 263 can sequentially rotate. The radar sensor 261 can control the emission of the electromagnetic wave and the reflected wave reception direction according to the rotation of the first rotor 263. Hence, the emission of the electromagnetic wave emitted by the radar sensor 261 and the reflected wave reception direction can be adjusted according to the rotation of the dial button 2040/2041/2042.

The scheme of using the servo motor 265 and the scheme of using the dial button 2040 can be used in a manner of being mixed. For example, the emission of the electromagnetic wave and the reflected wave reception direction can be adjusted via the dial button 2040 at first and the emission of the electromagnetic wave and the reflected wave reception direction can be secondarily adjusted via the servo motor 265. Or, the emission of the electromagnetic wave and the reflected wave reception direction can be adjusted via the servo motor 265 at first and the emission of the electromagnetic wave and the reflected wave reception direction can be secondarily adjusted via the dial button 2040.

And, the electronic device 200 can further include a reset button. If the reset button is inputted, it may be able to induce a user to make a specific gesture via such a user guide as voice guide and recognize the specific gesture of the user. The electronic device 200 determines a center point of hand of the user according to the recognized specific gesture and may be then able to guide the user to adjust the dial button 2040/2041/2042 to the determined center point.

The electronic device 200 can adjust a sensing range to precisely recognize a gesture of a user including a unique body condition via the aforementioned sensing range adjustment.

Figure 21:
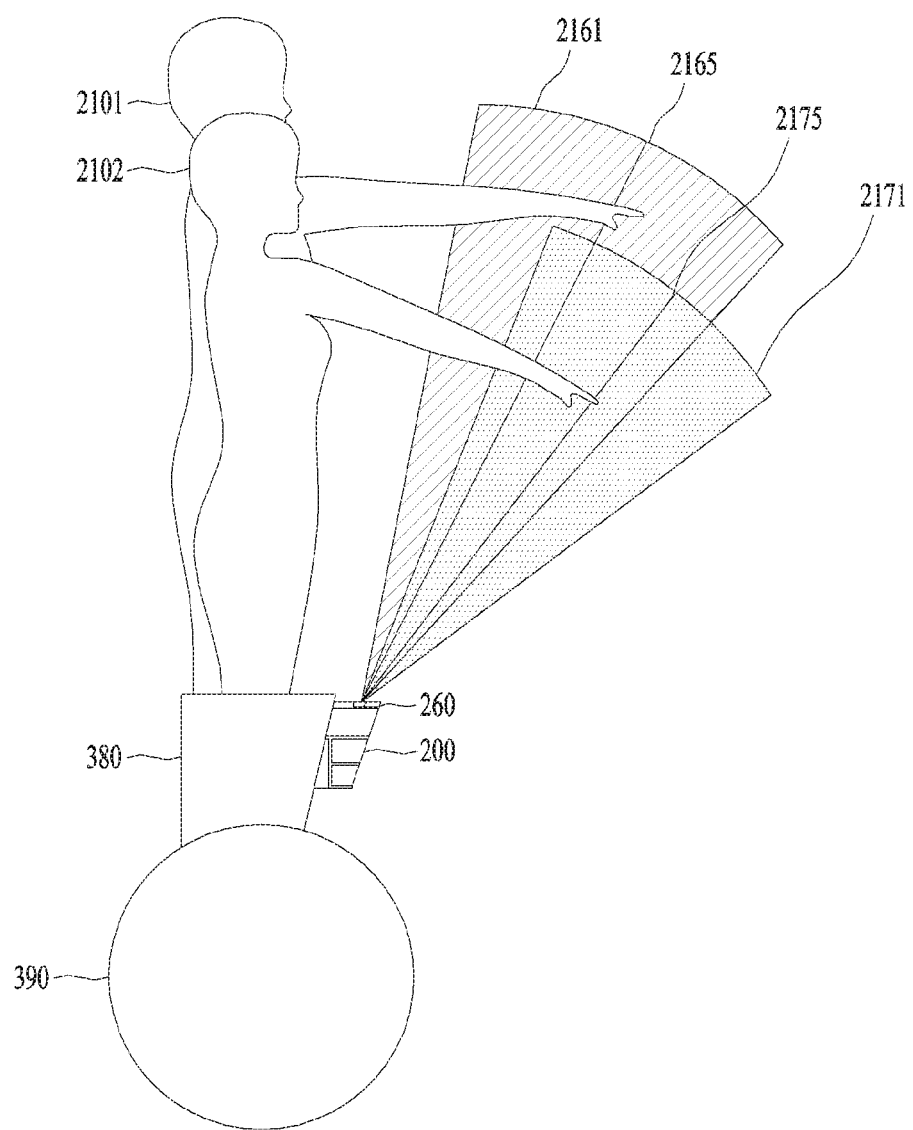
FIG. 21 is a diagram for a sensing range per user according to various embodiments of the present invention.

FIG. 21 is a diagram for a sensing range per user according to various embodiments of the present invention.

Referring to FIG. 21, the electronic device 200 can adjust a sensing range to a range respectively corresponding to a first user 2101 and a second user 2102 including a different body condition. For example, according to a sensing range for the first user 2101, the electronic device 200 emits a first electromagnetic wave 2161 and receives a reflected wave according to the emitted electromagnetic wave 2161 on the basis of a first center line 2165. According to a sensing range for the second user 2102, the electronic device 200 emits a second electromagnetic wave 2171 and receives a reflected wave according to the emitted electromagnetic wave 2171 on the basis of a second center line 2175. In particular, the electronic device 200 can adjust a sensing range to a range appropriate for a body condition of a user.

Meanwhile, as mentioned in the foregoing description, the electronic device 200 adjusts a sensing range to a range corresponding to a location of a sensed gesture and may be able to sense an additional gesture operation of a user to adjust the sensing range to a more accurate location.

The electronic device 200 can store the adjusted sensing range together with user information. When a user boards the personal mobility, the electronic device can adjust a sensing range of the control sensor module 260 using the stored sensing range.

Refer to FIG. 14 again.

The electronic device 200 can recognize a gesture of a user within the adjusted sensing range [S1450] and can perform a function corresponding to the recognized gesture [S1470].

The electronic device 200 can recognize a gesture of a user within the adjusted sensing range via the control sensor module 260. For example, the electronic device 200 can recognize a movement according to the gesture of the user, a speed of the movement, a direction of the movement, the extent of contact according to the movement, and the like via the control sensor module 260. And, the electronic device 200 determines a function or an operation corresponding to the recognized gesture and may be able to perform the recognized function or the operation. In this case, the function or the operation corresponding to the gesture can include not only an operation or a function of the electronic device 200 but also an operation or a function of the personal mobility device 300. Regarding this, it is explained in the following with reference to FIGS. 22 to 24.

FIGS. 22 to 23 are diagrams for an example of displaying a screen based on a gesture according to various embodiments of the present invention.

Referring to FIG. 22, the electronic device 200 can recognize a gesture 2200 of swiping a hand of the user in the left direction via the control sensor module 260. The electronic device 200 can project an image 2210 moved to the left as a function corresponding to the recognized gesture. Hence, a map, which is moved to the left compared to a map prior to the gesture, can be displayed on the image 2210 projected by the electronic device 200 through the projector 250.

Referring to FIG. 23, the electronic device 200 can recognize a pinch-out gesture 2300 of a user via the control sensor module 260. The electronic device 200 can magnify a projected image 2311 as a function corresponding to the recognized gesture. Hence, an image 2312, which is magnified compared to an image prior to the gesture, can be projected by the electronic device 200 through the projector 250. In this case, the magnified image 2312 may correspond to an image of a size bigger than a size of the previous image 2311.

The electronic device 200 according to various embodiments can perform an operation or a function related to the driving of the personal mobility device 300 as a function or an operation corresponding to a recognized gesture.

FIG. 24 is a diagram for an example of gestures for driving functions according to various embodiments of the present invention.

Referring to FIG. 24 (a), the electronic device 200 can recognize a gesture of unfolding both palms and can execute a menu or a function selected as an operation corresponding to the recognized gesture. And, if the gesture of unfolding both palms is recognized in the middle of driving the personal mobility device 300, the electronic device 200 can control the personal mobility device 300 to stop or reduce speed. Meanwhile, the electronic device 200 can recognize the gesture of unfolding both palms as a gesture for controlling the driving of the personal mobility device 300.

Referring to FIG. 24 (b), the electronic device 200 can recognize a gesture of folding a palm and can increase a moving speed of the personal mobility device 300 as an operation corresponding to the recognized gesture. And, the electronic device 200 can increase the moving speed of the personal mobility device 300 in response to a speed of making a fist of the gesture of folding the palm. The electronic device 200 may linearly increase the moving speed of the personal mobility device 300 to make a passenger of the personal mobility device 300 not to lose sense of balance.

Referring to FIG. 24 (c), the electronic device can recognize a gesture of extending one hand to the front among two clenched hands and can control the personal mobility device 300 to rotate in one direction as an operation corresponding to the recognized gesture. For example, if a gesture of extending a left fist is recognized, the electronic device 200 can control the personal mobility device 300 to rotate to the left. If a gesture of extending a right fist is recognized, the electronic device 200 can control the personal mobility device 300 to rotate to the right.

Referring to FIG. 24 (*d*), the electronic device 200 can recognize a gesture of extending a thumb of a clenched hand and can turn on a turn signal of one side of the personal mobility device 300 as an operation corresponding to the recognized gesture. For example, if a gesture of extending a thumb of a clenched hand to the left is recognized, the electronic device 200 can turn on a left turn signal of the personal mobility device 300. On the contrary, if a gesture of extending a thumb of a clenched hand to the right is recognized, the electronic device 200 can turn on a right turn signal of the personal mobility device 300.

When the electronic device 200 recognizes a gesture related to a driving function, if a hand of a user deviates from a sensing range, the electronic device 200 can output sound, vibration, light, or the like as a notification. If the deviation is maintained for more than prescribed time, the electronic device 200 can make the personal mobility device 300 stop. And, when the electronic device 200 recognizes a gesture related to a driving function, if both hands of a user deviate from a sensing range, the electronic device 200 can make the personal mobility device 300 stop.

When a gesture of a user is recognized, the electronic device 200 can output feedback in response to the recognized gesture. For example, the electronic device 200 can output sound, vibration, or light as the feedback according to the recognized gesture. By doing so, a user is able to know whether or not the electronic device 200 has recognized a gesture of a user.

And, when the personal mobility device 300 is in driving or on standby, if a palm of a user is recognized as a gesture recognition area and the control sensor module 260 recognizes the palm, the electronic device 200 can output sound, vibration, or light to signal the user that a gesture is recognizable.

As mentioned in the foregoing description, the electronic device 200 recognizes a gesture of a user and can perform various functions or operations corresponding to the recognized gesture.

When the personal mobility device 300 performs autonomous driving or automatic driving, the electronic device 200 according to various embodiments can project information on a moving path to a road. By doing so, when a passenger on the personal mobility device 300 changes a direction according to the autonomous driving or the automatic driving, it may be able to make the passenger know the direction change in advance. Regarding this, it is explained in the following with reference to FIGS. 25 to 26.

Figure 25:
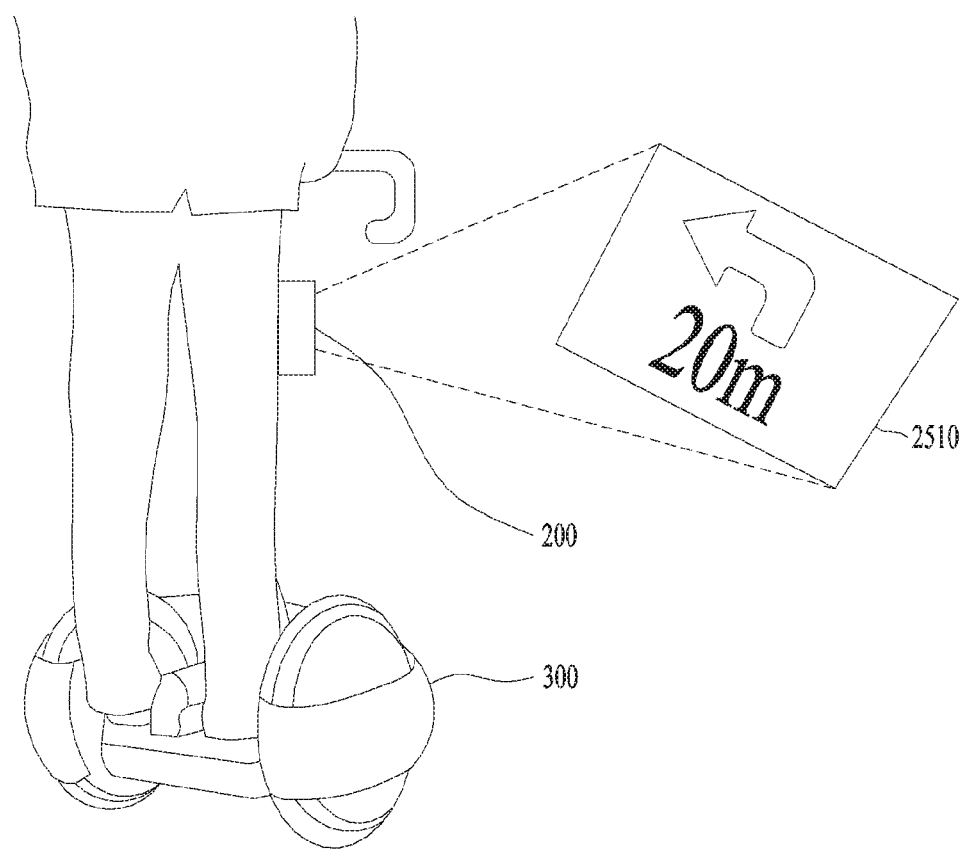
FIGS. 25 to 26 are diagrams for an example of projecting moving path information according to various embodiments of the present invention.
Figure 26:
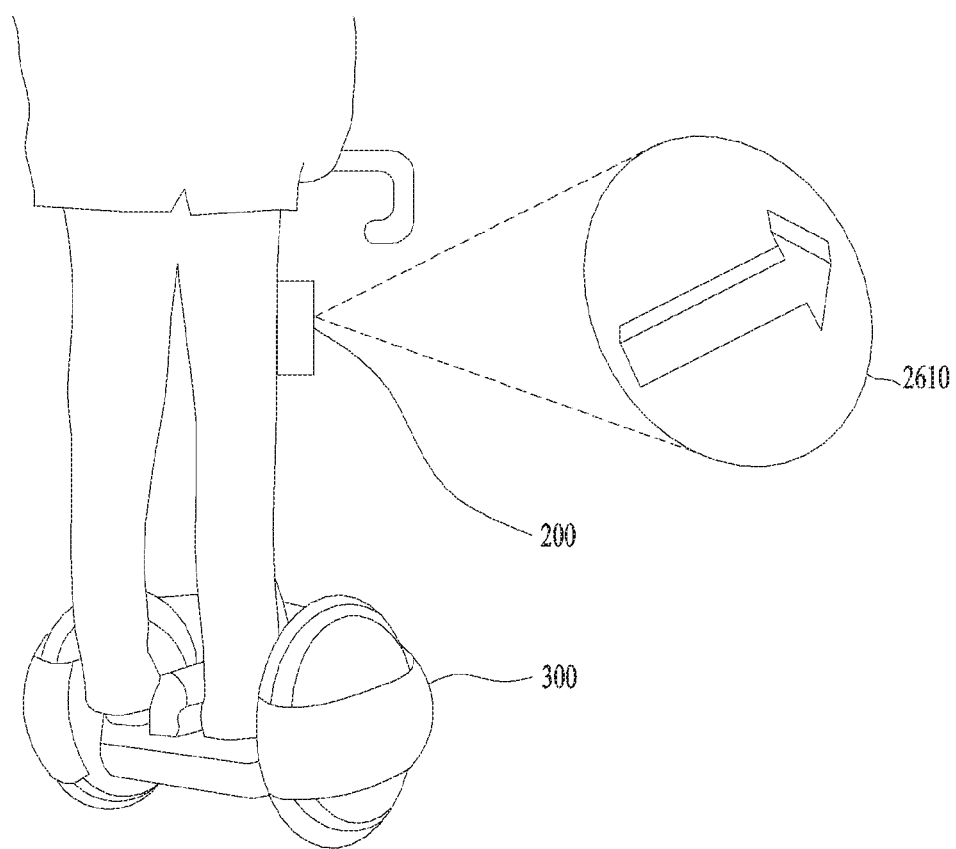

FIGS. 25 to 26 are diagrams for an example of projecting moving path information according to various embodiments of the present invention.

Referring to FIG. 25, the electronic device 200 can project path change information to a road according to a moving path of the personal mobility device 300 based on autonomous driving of the personal mobility device 300. For example, if the personal mobility device 300 makes a left turn 20 m ahead according to the automatic driving of the personal mobility device 300, the electronic device 100 can project information indicating that the personal mobility device 300 makes a left turn 20 m ahead to a road as an image 2510. By doing so, a passenger of the personal mobility device 300 is able to know the information that the personal mobility device 300 makes a left turn 20 m ahead in advance.

Referring to FIG. 26, the electronic device 200 can project a moving path of the personal mobility device 300 to a road according to the autonomous driving of the personal mobility device 300. For example, the electronic device 100 can project the moving path of the personal mobility device 300 to a road as an image 2510 according to the autonomous driving of the personal mobility device 300. By doing so, a passenger of the personal mobility device 300 is able to know the moving path of the personal mobility device 300 according to the autonomous driving of the personal mobility device 300 in advance.

If it is difficult to project an image to a road, the electronic device 200 according to various embodiments can project an image to a projectable area by changing an image projection direction. For example, if it is difficult to project an image to a road surface due to a foreign substance or water, the electronic device 200 can project an image to such an area as wall or the like. Regarding this, it is explained in the following with reference to FIG. 27.

Figure 27:
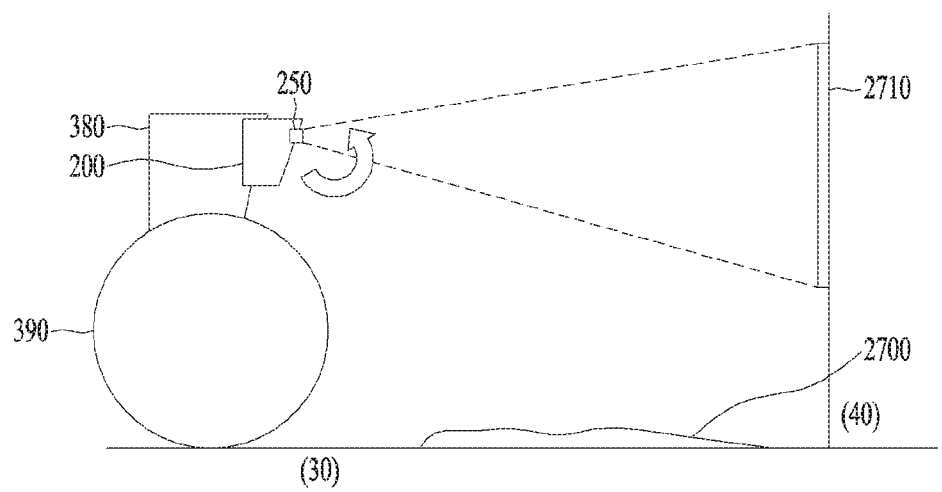
FIG. 27 is a diagram for an example of switching a projection direction according to various embodiments of the present invention.

FIG. 27 is a diagram for an example of switching a projection direction according to various embodiments of the present invention.

Referring to FIG. 27, if water 2700 forms puddles on a road surface 30, the electronic device 200 may determine that it is difficult to project an image to the road surface. The electronic device 200 can find out an area to which an image is to be projected and the electronic device can project the image to the area. For example, the electronic device 200 can find out a wall surface 40 located at the front of the electronic device 200 as an area to which an image is to be projected and the electronic device 200 can project an image 2710 to the wall surface 40. Specifically, the electronic device 200 changes a projection direction of the projector 250 from a direction of the road surface 30 to a direction of the wall surface 40 and can control the projector 250 of which the projection direction has been changed to project the image 2710. And, the electronic device 200 can change an image projection direction in response to a manual operation for the projection direction of the projector 250 or the electronic device 200 can change the image projection direction via gesture recognition. As mentioned in the foregoing description, if it is difficult to project an image to the road surface, the electronic device 200 can change the image projection direction.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the electronic device.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of operating an electronic device, the method comprising:
   outputting an infrared (IR) grid on a road;
   receiving the output IR grid;
   determining a bump status of the road based on a grid shape of the received IR grid; and
   outputting an image containing at least one of a predetermined color, brightness, or flickering to a dangerous area where the bump status of the road is equal to or greater than a reference based on the determined bump status.

2. The method of claim 1, further comprising determining a road status of the road based on performance of a mobility device on which the electronic device is mounted, a driving history of the mobility device, and body information of a user on the mobility device.

3. The method of claim 2, further comprising:
   outputting road status information on the road based on the determined road status; and
   detecting a moving speed of the electronic device,
   wherein the outputting the road status information on the road comprises outputting the road status information to a distance corresponding to the detected moving speed.

4. A method of operating an electronic device configured to output an image on a road, the method comprising:
   sensing a moving speed of a mobility device on which the electronic device is mounted;
   outputting information related to driving of the mobility device on the road of a distance shorter than a first distance from the electronic device when the sensed moving speed is less than a first reference speed; and
   outputting the information on the road of a distance longer than the first distance from the electronic device when the sensed moving speed is equal to or greater than the first reference speed and less than a second reference speed,
   wherein the second reference speed is faster than the first reference speed.

5. The method of claim 4, further comprising not outputting the information on the road when the sensed speed is equal to or greater than the second reference speed.

6. The method of claim 4, further comprising:
   determining a braking distance of the mobility device based on performance of the mobility device and body information of a user on the mobility device; and
   outputting the information related to the driving of the mobility device to a distance corresponding to the determined braking distance on the road.

7. The method of claim 4, wherein the outputting the information related to the driving of the mobility device comprises outputting at least one of a moving path of the mobility device, a moving speed, or information on a dangerous area of the road on the road.

8. An electronic device, comprising:
   a projector configured to output an image;
   a light emitting module configured to output an infrared (IR) grid on a road;
   a camera configured to receive the output IR grid; and
   a controller configured to:
      determine a bump status of the road based on a grid shape of the received IR grid; and
      control the projector to output an image containing at least one of a predetermined color, brightness, or flickering to a dangerous area where the bump status of the road is equal to or greater than a reference based on the determined bump status.

9. The electronic device of claim 8, wherein the controller is further configured to determine a road status of the road based on performance of a mobility device on which the electronic device is mounted, a driving history of the mobility device, or body information of a user on the mobility device.

10. The electronic device of claim 9, further comprising a sensor module configured to detect a moving speed of the electronic device,
    wherein the controller is further configured to control the projector to:
       output road status information on the road based on the determined road status; and
       output the road status information to a distance corresponding to the detected moving speed.

11. An electronic device configured to project an image on a road, the electronic device comprising:
    a projector configured to output an image;
    a sensing module configured to sense a moving speed of a mobility device to which the electronic device is mounted; and
    a controller configured to:
       control the projector to output information related to driving of the mobility device to the road at a distance shorter than a first distance from the electronic device when the sensed moving speed is less than a first reference speed; and
       control the projector to output the information to the road at a distance longer than the first distance from the electronic device when the sensed moving speed is equal to or greater than the first reference speed and less than a second reference speed,
    wherein the second reference speed is faster than the first reference speed.

12. The electronic device of claim 11, wherein the controller is further configured to control the projector not to output the information related to the driving of the mobility device to the road when the sensed moving speed is equal to or greater than the second reference speed.

13. The electronic device of claim 11, wherein the controller is further configured to:
- determine a braking distance of the mobility device based on performance of the mobility device and body information of a user on the mobility device; and
- control the projector to output the information related to the driving of the mobility device to a distance corresponding to the determined braking distance on the road.

14. The electronic device of claim 11, wherein the controller is further configured to control the projector to output at least one of a moving path of the mobility device, a moving speed, or information on a dangerous area of the road to the road.

* * * * *